US012018819B2

(12) United States Patent
Ribeiro et al.

(10) Patent No.: US 12,018,819 B2
(45) Date of Patent: Jun. 25, 2024

(54) FLOATING CONNECTOR

(71) Applicant: UBICQUIA, INC., Fort Lauderdale, FL (US)

(72) Inventors: Claudio Santiago Ribeiro, Evanston, IL (US); Eduardo Marabotto, Miami, FL (US); Stephen M. Oshgan, Arlington Heights, IL (US)

( * ) Notice: Subject to any disclaimer, the term of this patent is extended or adjusted under 35 U.S.C. 154(b) by 60 days.

(21) Appl. No.: 17/536,187

(22) Filed: Nov. 29, 2021

(65) Prior Publication Data

US 2022/0228728 A1 Jul. 21, 2022

Related U.S. Application Data

(63) Continuation of application No. 17/154,957, filed on Jan. 21, 2021, now Pat. No. 11,187,400.

(51) Int. Cl.
*H01R 33/00* (2006.01)
*F21S 8/08* (2006.01)
(Continued)

(52) U.S. Cl.
CPC .............. *F21V 17/06* (2013.01); *F21S 8/086* (2013.01); *F21V 23/008* (2013.01); *F21V 23/06* (2013.01);
(Continued)

(58) Field of Classification Search
CPC ........ F21V 17/06; F21V 23/06; F21V 23/008; H01R 35/04; F21S 8/086; F21W 2131/103
See application file for complete search history.

(56) References Cited

U.S. PATENT DOCUMENTS 4,477,143 A * 10/1984 Taylor ...................... F21V 17/02 439/559
5,235,252 A * 8/1993 Blake ...................... H05B 47/20 315/159
(Continued)

OTHER PUBLICATIONS

U.S. Patent & Trademark Office (as International Searching Authority), International Search Report in connection with counterpart International Application No. PCT/US2022/012998, dated Apr. 13, 2022, 2 pages.
(Continued)

*Primary Examiner* — Abdullah A Riyami
*Assistant Examiner* — Nelson R. Burgos-Guntin
(74) *Attorney, Agent, or Firm* — Daniel C. Crilly

(57) ABSTRACT

A floating connector includes a housing, a substantially planar surface positioned within the housing, a set of electrical contacts, and a bushing. The set of electrical contacts are arranged substantially normal to the planar surface. The bushing is cooperatively mated with the housing and the planar surface so as to permit the bushing to pivot the planar surface about one or more points. In one exemplary embodiment, the bushing defines a pair of diametrically opposite pin apertures. In such an embodiment, the floating connector may further include a pair of pivot pins, where each pivot pin passes through a respective one of the pin apertures and pivotally interconnects the bushing and the housing. Additionally, the housing may define a pair of diametrically opposite wells to receive the pivot pins. The floating connector may form part of an electronic apparatus that is mountable to a luminaire of a streetlight.

18 Claims, 26 Drawing Sheets

(51) Int. Cl.

| | |
|---|---|
| ***F21V 17/06*** | (2006.01) |
| ***F21V 23/00*** | (2015.01) |
| ***F21V 23/06*** | (2006.01) |
| ***H01R 35/04*** | (2006.01) |
| *F21W 131/103* | (2006.01) |

(52) U.S. Cl.
CPC ....... *H01R 35/04* (2013.01); *F21W 2131/103* (2013.01)

(56) References Cited

U.S. PATENT DOCUMENTS

| | | | | |
|---|---|---|---|---|
| 5,595,503 | A * | 1/1997 | Pittman | H01R 13/56 439/11 |
| 6,579,333 | B2 * | 6/2003 | Huang | B01D 46/4245 55/467 |
| 6,872,054 | B2 | 3/2005 | Pearce | |
| 8,038,481 | B1 * | 10/2011 | Creighton | H01R 33/9456 439/660 |
| 8,143,568 | B2 * | 3/2012 | Flaherty | G01J 1/02 250/239 |
| 8,147,097 | B1 * | 4/2012 | Hsiao | F21S 8/035 439/11 |
| 8,348,478 | B2 * | 1/2013 | Pelton | F21V 17/02 362/373 |
| 8,864,514 | B2 * | 10/2014 | Ilyes | H01R 24/38 439/337 |
| 10,082,726 | B2 | 9/2018 | Fagerkvist | |
| 10,330,301 | B1 * | 6/2019 | Howard | F21V 23/06 |
| 11,187,400 | B1 | 11/2021 | Ribeiro et al. | |
| 2007/0057807 | A1 * | 3/2007 | Walters | H04L 67/025 340/7.29 |
| 2007/0215027 | A1 * | 9/2007 | MacDonald | B63C 11/49 114/66 |
| 2011/0076873 | A1 * | 3/2011 | Fonzo | H01R 35/02 439/485 |
| 2014/0127937 | A1 * | 5/2014 | Huang | H01R 35/04 439/534 |
| 2018/0045388 | A1 * | 2/2018 | McDowell | F21V 29/15 |
| 2019/0341732 | A1 * | 11/2019 | Aaron | H04B 10/2575 |
| 2019/0363498 | A1 * | 11/2019 | Cox | B25J 19/0029 |
| 2020/0370742 | A1 * | 11/2020 | Zimmerman, III | F21S 8/086 |
| 2020/0373682 | A1 * | 11/2020 | Root | H01Q 1/1228 |
| 2020/0375000 | A1 * | 11/2020 | Reed | H05B 45/12 |
| 2020/0383173 | A1 * | 12/2020 | Aaron | F21V 23/0435 |

OTHER PUBLICATIONS

U.S. Patent & Trademark Office (as International Searching Authority), Written Opinion of the International Searching Authority in connection with counterpart International Application No. PCT/US2022/012998, dated Apr. 13, 2022, 4 pages.

* cited by examiner 110a
112
138
138a
4D

138

138

138

138

138

138

138

138

FLOATING CONNECTOR

CROSS-REFERENCE TO RELATED APPLICATIONS

The present application is a continuation of U.S. application Ser. No. 17/154,957, now U.S. Pat. No. 11,187,400, which application was filed Jan. 21, 2021 and is incorporated herein by this reference as if fully set forth herein.

BACKGROUND

Technical Field

The present disclosure generally relates to a connector arranged for coupling a controller to an aerial fixture mounted on a utility pole. More particularly, but not exclusively, the present disclosure relates to a connector having a floating substructure; the connector in some cases being integrated with the controller.

Description of the Related Art

Aerial lighting fixtures are known to include conventional light controllers. These conventional light controllers may be electric devices, mechanical devices, or electromechanical devices. Generally, if the controller detects an amount of light that is determined to be insufficient, the controller will direct the light source in the aerial lighting fixture to illuminate. On the other hand, if the controller detects an amount of light that is determined to be sufficient, the controller will direct the light source in the aerial lighting fixture to extinguish. In these and other cases, certain devices capable of wireless networking are electromechanically coupled to the aerial lighting fixture. These wireless-networking-capable devices may be small cells, access points that provide public Internet conductivity, private cellular systems devices, or the like.

In many cases, the conventional light controllers, wireless-networking-capable devices, or other devices are coupled to the aerial lighting fixture via a standards-compliant connector. The connector may provide electric coupling, mechanical coupling, or electromechanical coupling.

Exemplary devices capable of lighting control, wireless networking, and other functionality are described in U.S. Provisional Patent Application No. 62/614,914, filed Jan. 8, 2018, International Patent Application No. PCT/US2019/012775 filed Jan. 8, 2019, and various other patent applications claiming priority to at least one of these. The disclosures of all references mentioned above and throughout the specification, as well as the disclosures of all references mentioned in those references, are hereby incorporated herein by reference to the fullest extent permitted under law.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, the NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like.

NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

As more functionality has been added to devices that are electromechanically coupled to streetlights or elsewhere on utility poles, the devices have become larger, non-uniformly shaped, constructed with unevenly distributed weight, constructed with a center of gravity having a moment distant from the standardized power connector, and having other physical characteristics that lead to non-symmetries during installation and placement of the devices. These characteristics can overstress a standardized power connector during installation, removal, severe weather, unusual stress on the utility pole (e.g., a vehicle colliding with the utility pole), and at other times. In these and other cases, it has also been recognized by the present inventors that the standardized power connector often does not have a symmetrical relationship with the body of the luminaire, the support arm to which the luminaire is attached, or both. To overcome the challenges caused by these characteristics, the present inventors have created various systems, devices, and methods related to a floating connector (i.e., the teaching of the present disclosure) that also remains compliant to at least one roadway area lighting standard.

The device, method, and system embodiments described in this disclosure (i.e., the teachings of this disclosure) implement a floating connector arranged for electromechanical coupling to a connector that is compliant with a particular standard such as a roadway area lighting standard promoted by a standards body. In some cases, the floating connector is also compliant with the subject standard.

In a first embodiment, a system to couple a controller to a roadway-area-lighting-standard-compliant female connector that is integrated in a roadside aerial lighting fixture, comprises: a floating male connector integrated with a housing of the controller, wherein the floating male connector is arranged for substantially permanent coupling to the roadway-area-lighting-standard-compliant female connector, the floating male connector including: a substantially planar surface; a first set of electrical contacts protruding from the substantially planar surface, wherein the first set of electrical contacts is arranged about a first central axis that is substantially normal to the substantially planar surface; and a substructure integrated with the floating male connector, the substructure arranged to movably isolate at least a portion of the floating male connector from the housing of the controller during an act of electromechanically coupling the first set of electrical contacts of the floating male connector to a second set of electrical contacts recessed in the roadway-area-lighting-standard-compliant female connector.

In some cases of the first embodiment, the roadway-area-lighting-standard-compliant female connector is compliant with American National Standards Institute (ANSI) C136. In some of these cases, the primary roadway-area-lighting-standard-compliant female connector is compliant with ANSI C136.41-2013.

Sometimes, the substructure integrated with the floating male connector further comprises: a tilt housing; and a tilt ball structure arranged within the tilt housing, wherein the tilt ball structure is arranged to pivot within the tilt housing about at least one point. In at least some of these cases, the tilt ball structure is arranged to pivot within the tilt housing about at least two points. In other cases of the first embodiment, the tilt ball structure is arranged to pivot within the tilt housing about at least four points.

In certain cases of the first embodiment, the substructure integrated with the floating male connector further comprises: a tilt housing; a tilt ball structure arranged within the tilt housing, wherein the tilt ball structure is arranged to pivot within the tilt housing about at least two points; at least two pivot pins that enable the pivoting within the tilt housing about the at least two points; a first retaining structure arranged to retain the tilt ball structure within the tilt housing; and an O-ring arranged to flexibly seal internal structures of the floating male connector.

In some first embodiment cases, the controller includes a smart streetlight controller. Sometimes, the controller includes a small cell. And sometimes, the controller includes wireless access point circuitry. In these and still other cases, the substructure permits the housing of the controller to be at least five degrees (5°) out of parallel with the substantially planar surface.

In a second embodiment, a floating connector, comprises: at least one housing structure; a first substantially planar surface positioned within the at least one housing structure; a first set of electrical contacts protruding from the first substantially planar surface and arranged about a first central axis, the first central axis being substantially normal to the first substantially planar surface, wherein the first set of electrical contacts is arranged for substantially permanent coupling to a second set of electrical contacts of a female connector that is compliant with a roadway area lighting standard promoted by a standards body, the second set of electrical contacts recessed into a second substantially planar surface of the female connector and the second set of electrical contacts arranged about a second central axis, the second central axis being substantially normal to the second substantially planar surface; and a substructure integrated with the floating connector, the substructure arranged to provide the first substantially planar surface with a range of motion relative to the at least one housing structure.

In some cases of the second embodiment, the range of motion relative to the at least one housing structure is about zero to five degrees (5°) in at least one direction. In other cases, the range of motion relative to the at least one housing structure is at least five degrees (5°) in at least two directions.

Sometimes in the second embodiment, the floating connector further comprises: a tilt ball structure arranged within the at least one housing structure, wherein the tilt ball structure is arranged to move within the at least one housing structure about at least two points; at least two pivot pins that enable the motion of the tilt ball structure within the at least one housing structure about the at least two points; a first retaining structure arranged to retain the tilt ball structure within the at least one housing structure; and an O-ring arranged to flexibly seal internal structures of the floating connector. In some cases, the floating connector further comprises power circuitry electrically coupled to the first set of electrical contacts.

In a third embodiment, a method comprises: positioning a controller proximate a roadside aerial lighting fixture, wherein a primary male connector is integrated with a housing of the controller, wherein a primary female connector is integrated with the roadside aerial lighting fixture, and wherein the primary female connector is compliant with a roadway area lighting standard promoted by a standards body; rotatably coupling a first set of electrical contacts that protrude from a first substantially planar surface integrated with the primary male connector into a second set of electrical contacts that are recessed into a second substantially planar surface integrated with the primary female connector, wherein the first set of electrical contacts is arranged about a first central axis, the first central axis being substantially normal to the first substantially planar surface, and wherein the second set of electrical contacts is arranged about a second central axis, the second central axis being substantially normal to the second substantially planar surface; during the rotatable coupling, permitting the controller to float about the first substantially planar surface in an orientation that is not parallel to the first substantially planar surface; and during the rotatable coupling, mechanically limiting the float of the controller in at least one direction.

In some cases, the method further comprises sealing internal structures of the primary male connector via an O-ring. In some cases, the method comprises providing power to the controller via the first and second sets of electrical contacts. Sometimes in the third embodiment, the primary female connector is compliant with ANSI C136.41-2013.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings.

In the present disclosure, for brevity, certain sets of related figures may be referred to as a single, multi-part figure to facilitate a clearer understanding of the illustrated subject matter. For example, FIGS. 2A-2C may be individually or collectively referred to as FIG. 2. FIGS. 4A-4H may be individually or collectively referred to as FIG. 4. FIGS. 5A-5B may be individually or collectively referred to as FIG. 5. FIGS. 6A-6D may be individually or collectively referred to as FIG. 6. FIGS. 7A-7B may be individually or collectively referred to as FIG. 7. FIGS. 8A-8E may be individually or collectively referred to as FIG. 8. FIGS. 9A-9E may be individually or collectively referred to as FIG. 9. FIGS. 10A-10F may be individually or collectively referred to as FIG. 10. FIGS. 11A-11B may be individually or collectively referred to as FIG. 11. FIGS. 12A-12B may be individually or collectively referred to as FIG. 12. FIGS. 13A-13B may be individually or collectively referred to as FIG. 13. FIGS. 14A-14C may be individually or collectively referred to as FIG. 14. FIGS. 15A-15C may be individually or collectively referred to as FIG. 15. Structures earlier identified are not repeated for brevity.

DETAILED DESCRIPTION

Figure 1:
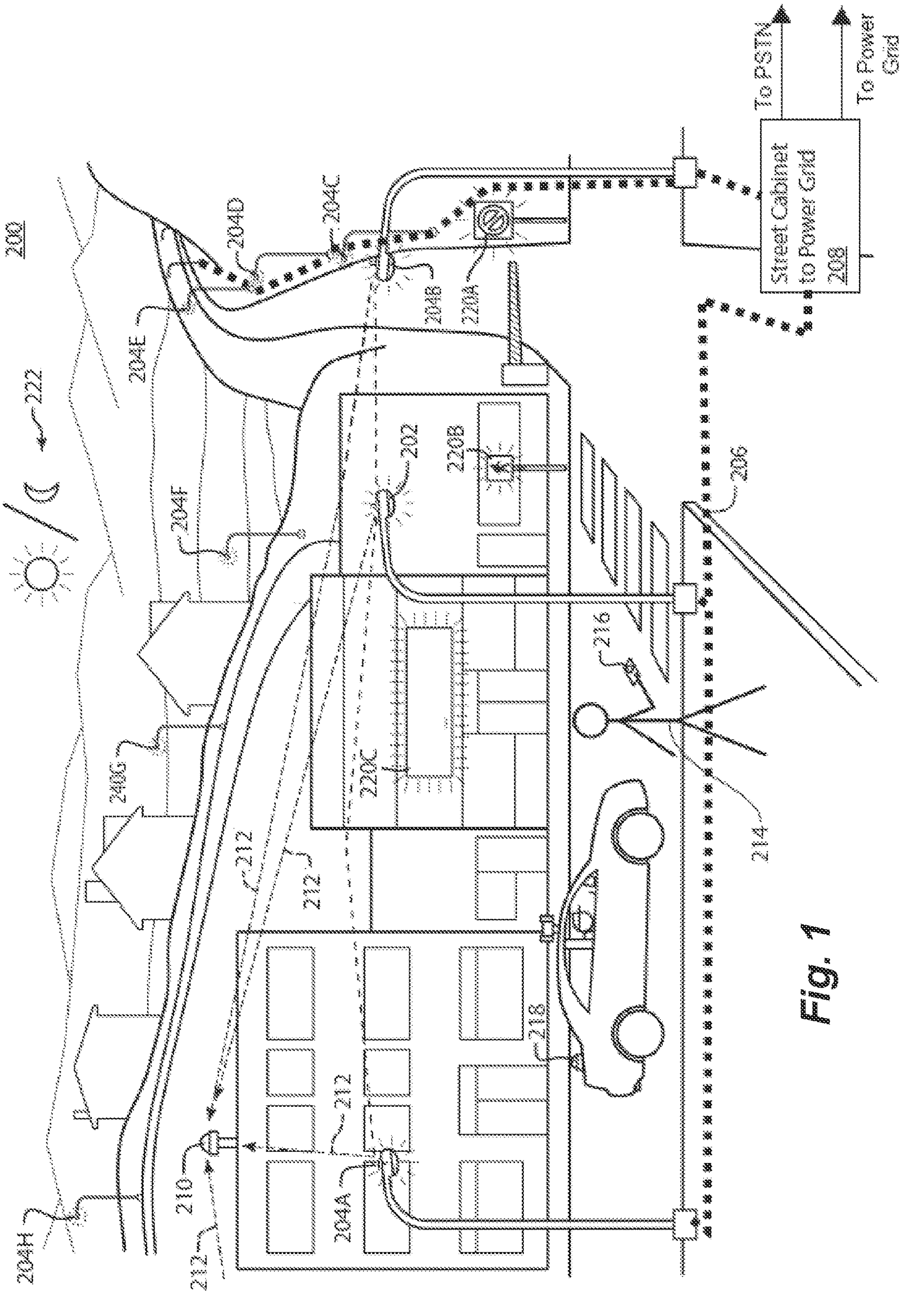
FIG. 1 is a system level deployment of aerial control fixtures, at least some having floating connectors, coupled to streetlight fixtures.

The device, method, and system embodiments described in this disclosure (i.e., the teachings of this disclosure) enable an aerial control fixture to be more flexibly mounted to a device having a standards-based connector such as an aerial lighting fixture. In cases where one or both of the aerial control fixture and the device having the standards-based connector are configured with a floating connector, the reliability of the system is improved during installation, removal, severe weather, and in other cases. In at least some cases, one or more of the floating connector embodiments described in the present disclosure are also standards-based connectors.

An embodiment of the present invention is arranged as a system to couple an aerial control fixture (e.g., a "controller") to a roadside aerial lighting fixture (e.g., "light fixture," "luminaire," or the like). The system includes at least one floating connector 138 (FIGS. 7-13). The floating connector has a primary connector that is compliant with a particular roadway area lighting standard promoted by a standards body. The floating connector also has an integrated substructure 140 (FIGS. 11B, 12B) that is arranged to movably isolate at least a portion of the floating connector from a housing of the aerial control fixture.

In some embodiments of the floating connector, a primary male floating connector is integrated with the aerial control fixture, and a primary female connector is integrated with the roadside aerial lighting fixture. The primary male floating connector and the primary female connector are compliant with a roadway area lighting standard promoted by a standards body. A first set of electrical contacts of the primary male connector protrude from a first substantially planar surface of the controller. The first set of electrical contacts of the primary male connector are arranged about a first central axis, which is substantially normal to the first substantially planar surface. The primary female connector is recessed within a second substantially planar surface of the light fixture. A second set of electrical contacts of the primary female connector are arranged about a second central axis, which is substantially normal to the second substantially planar surface. A substructure integrated with the primary male floating connector is arranged to provide the first substantially planar surface with a range of motion relative to the housing of the controller. When the controller is rotatably coupled to the light fixture, the first set of electrical contacts of the primary male floating connector is electrically coupled to the second set of electrical contacts of the primary female connector. The floating connector structures reduce stress on the system during the rotational coupling.

The floating connector embodiments described in the present disclosure are directed toward structures having male electrical contacts, but one of skill in the art will recognize that the principles of the present invention may be equally applied to structures having female electrical contacts. Hence, in the present disclosure, the term, "floating connector," may be used with a primary male connector (i.e., a connector having a protruding set of electrical contact) a primary female connector (i.e., a connector having a recessed set of electrical contacts), or both a primary male connector and a primary female connector.

The electrical contacts described herein may include pins, receptacles, spring-loaded electrical contacts, friction based electrical contacts, screw down electrical contacts, and many other electrical contact embodiments.

The primary connector portion of a floating connector is compliant with a particular standard. For example, the primary connector portion may be compliant with a NEMA American National Standard directed toward Roadway and Area Lighting Equipment (i.e., ANSI C136) such as ANSI C136.41, ANSI C136.41-2013, or some other standard.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring more detailed descriptions of the embodiments.

FIG. 1 is a system level deployment 200 of aerial control fixtures, at least some having floating connectors, coupled to streetlight fixtures. The streetlight fixtures are coupled to or otherwise arranged as part of a system of utility poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. Those of ordinary skill in the art will understand that aerial control fixtures as described herein do not need to be directly coupled to streetlight fixtures and instead, such aerial control fixtures can be coupled to buildings, towers, masts, signage, or another suitable structure. Nevertheless, for simplicity in the description, aerial control fixtures described herein are coupled to streetlight fixtures.

As shown in the system level deployment 200, a plurality of utility poles are arranged in one or more determined geographic areas, and each utility pole has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground.

The system of utility poles, streetlight fixtures, streetlight sources, or the like in the system level deployment may be controlled by a municipality or other government agency. In other cases, the system utility poles, streetlight fixtures, streetlight sources, or the like in the system level deployment is controlled by a private entity (e.g., private property owner, third-party service contractor, or the like). In still other cases, a plurality of entities share control of the system of utility poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of utility poles, streetlight fixtures, streetlight sources, or the like can be granted some control such as in a neighborhood, around a hospital or fire department, in a construction area, or in some other manner.

In the system level deployment 200 of FIG. 1, any number of streetlight fixtures may be arranged with a floating connector 138 (FIGS. 7-13) having at least one connector portion that is compliant with a roadway area lighting standard promoted by a standards body. The floating connector permits the controlling or servicing authority of the system to competitively and efficiently purchase and install light sensors on each streetlight fixture. In addition, or in the alternative, the floating connector in each device permits the controlling or servicing authority to replace conventional light sensors with other devices such as aerial control fixtures (FIGS. 3, 4, 7, 14, 15).

In the system level deployment 200, an aerial control fixture arranged as a small cell networking device may be electromechanically coupled to a selected utility pole wherein the electromechanical coupling is performed via the floating connector. A plurality of utility poles may also have aerial control fixtures arranged as smart sensor devices 204A-204H. In these utility poles 204A-204H, each streetlight fixture is equipped with an aerial control fixture arranged as a smart sensor device (i.e., aerial control fixture 110*a* embodiment in FIG. 4) that is electromechanically coupled via a respective floating connector having at least one portion that is compliant with the roadway area lighting standard promoted by the standards body. In this arrangement, each streetlight 202, 204A-204H is equipped with an aerial control fixture arranged as a light sensor that is further electrically coupled to a processor-based light control circuit.

The processor-based light control circuit of each aerial control fixture smart device is arranged to provide a light control signal to its respective light source based on at least one ambient light signal generated by its associated the light sensor. In addition, because each streetlight 202, 204A-204H is equipped with communication capabilities, each light source in each streetlight 202, 204A-204H can be controlled remotely as an independent light source or in combination with other light sources. In these cases, each of the plurality of utility poles with aerial control fixtures arranged as smart sensor devices 204A-204H may be communicatively coupled to the utility pole and aerial control fixture arranged as a small cell networking device 202. The communicative relationship from each of the plurality of utility poles and aerial control fixture arranged as a smart sensor device 204A-204H to the utility pole and aerial control fixture arranged as a small cell networking device 202 may be a direct communication or an indirect communication. That is, in some cases, one of the plurality of utility poles and aerial control fixtures arranged as a smart sensor device 204A-204H may communicate directly to the utility pole and with aerial control fixture arranged as a small cell networking device 202 or the one of the plurality of utility poles and aerial control fixture arranged with a smart sensor device 204A-204H may communicate via one or more other ones of the plurality of utility poles and aerial control fixtures arranged as a smart sensor device 204A-204H.

In the system level deployment 200 of FIG. 1, various ones of the utility poles may be 50 feet apart, 100 feet apart, 250 feet apart, or some other distance. In some cases, the type and performance characteristics of each small cell networking device and each smart sensor device are selected based on their respective distance to other such devices such that wireless communications are acceptable.

The utility pole and aerial control fixture arranged as a small cell networking device 202 and each utility pole and aerial control fixture arranged as a smart sensor device 204A-204H may be coupled to a street cabinet 208 or other like structure that provides utility power (e.g., "the power grid") in a wired way. The coupling includes electrical coupling via a primary connector portion of a floating connector. The coupling may also include data coupling via a secondary data connector portion of the connector. The utility power may provide 120 VAC, 240 VAC, 260 VAC, or some other power source voltage. In addition, the utility pole and aerial control fixture arranged as a small cell networking device 202, and optionally one or more of the utility poles and aerial control fixtures arranged as smart sensor devices 204A-204H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 200 of FIG. 1, the wired backhaul and power line 206 is illustrated as a single line. The street cabinet 208 is coupled to the power grid, which is administered by a licensed power utility agency, and the street cabinet 208 is coupled to the public switched telephone network (PSTN).

Each utility pole and aerial control fixture arranged as a smart sensor device 204 may be in direct or indirect wireless communication with the utility pole and aerial control fixture arranged as a cell networking device 202. In addition, each utility pole and aerial control fixture arranged as a smart sensor device 204 and the utility pole and aerial control fixture arranged as a small cell networking device 202 may also be in direct or indirect wireless communication 212 with an optional remote computing device 210. The remote computing device 210 may be controlled by a mobile network operator (MNO), a municipality, another government agency, a third party, or some other entity. By this optional arrangement the remote computing device can be arranged to wirelessly communicate light control signals and any other information (e.g., packetized data) between itself and each respective wireless networking device coupled to any of the plurality of utility poles.

A user 214 holding a mobile device 216 is represented in the system level deployment 200 of FIG. 1. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use their mobile device 216 to establish a wireless communication session over a cellular-based network controlled by an MNO, wherein packetized wireless data is passed through the utility pole and aerial control fixture arranged as a small cell networking device 202. Concurrently, the in-vehicle mobile device 218 may also establish a wireless communication session over the same or a different cellular-based network controlled by the same or a different MNO, wherein packetized wireless data of the second session is also passed through the utility pole and aerial control fixture arranged as a small cell networking device 202.

Other devices may also communicate through utility pole-based devices of the system level deployment 200. These devices may be internet of things (IoT) devices or some other types of devices. In FIG. 1, two public information signs 220A, 220B, and a private entity sign 220C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 1.

The sun and moon 222 are shown in FIG. 1. Light or the absence of light based on time of day, weather, geography, or other causes provide information (e.g., ambient light) to the light sensors of the utility pole mounted devices described in the present disclosure. Based on this information, the associated light sources may be suitably controlled.

Figure 2A:
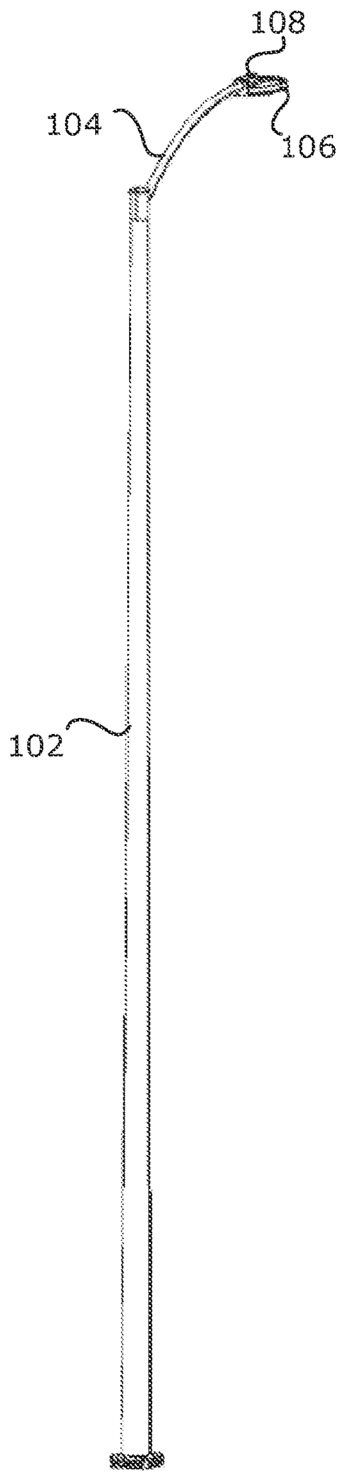
Fig. 2A (Prior Art)
FIGS. 2A-2C are a utility pole with a support arm and a streetlight luminaire mounted to the support arm in various levels of detail.
Figure 2B:
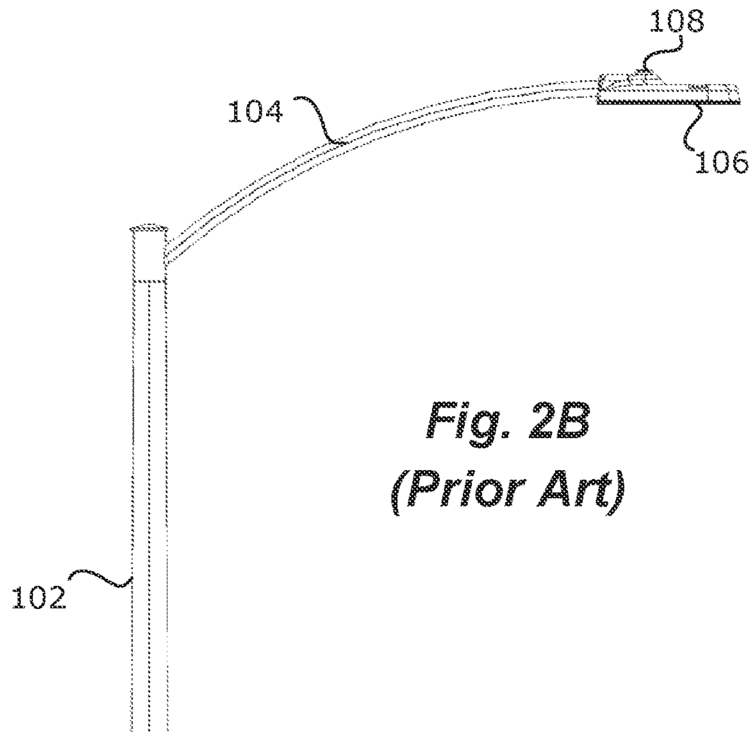
Fig. 2B (Prior Art)
Figure 2C:
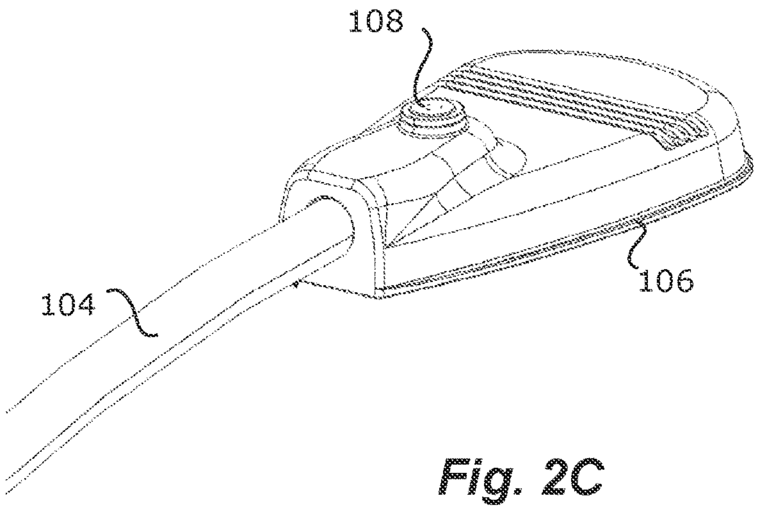
Fig. 2C (Prior Art)

FIGS. 2A-2C are a conventional utility pole 102 with a support arm 104 and a streetlight luminaire 106 mounted to the support arm 104 in various levels of detail. The luminaire 106 has at least one connector 108 that is compliant with a roadway area lighting standard promoted by a standards body. In at least some cases, such a connector may also be referred to as a standardized powerline interface. Conventional utility poles 102, such as those shown in FIG. 2, may be used to support devices that include one or more inventive floating connectors of the present disclosure.

Utility poles are columns, posts, towers, masts, or other structures that are used to carry overhead support cables, powerlines, cable-company cables (e.g., television programming, cable-Internet, cable-telephone, and other like cables), fiberoptic cables, and various other public utilities along with related electrical, telecommunications, and other like equipment such as transformers, streetlights, data repeaters, and the like. Utility poles may be constructed of wood, concrete, galvanized steel, stainless steel, a composite material, or some other suitable material. The term, "utility pole," as used in the present disclosure, is not limited. For example, one of skill in the art will recognize, that in at least some cases, luminaires, and other such devices include a standardized powerline interface. In these cases, the control devices discussed herein may include one or more floating connectors, which will be electromechanically coupled to the standardized powerline interface connector of the particular utility pole, or other structure that performs the functions of a utility pole. Along these lines, the aerial lighting fixtures of the present disclosure, which may be interchangeably referred to as streetlights (even in cases where the aerial lighting fixture is not above a "street"), may be positioned on utility poles or any other suitable structure.

The standardized powerline interface (e.g., ANSI C136.41 "NEMA" connector, Zhaga connector, or the like). The standardized powerline interface includes a standardized powerline connector 108, which in at least some cases is also referred to as a standardized powerline socket.

In some cases, standardized powerline conduits are coupled to a first connection point (e.g., contact, pin, pad, terminal, lug, blade, or the like) a second connection point, and a third connection point. In at least some cases, the first connection point is wired to provide a common/neutral/ground contact, the second connection point is wired to provide a power/line voltage contact, and the third connection point is wired to provide a load contact. In at least some cases, a 260 VAC powerline source (e.g., a power grid source voltage, utility power, or the like) is coupled to the three corresponding contacts of the standardized powerline connector 140 via a streetlight. The standardized powerline connector 108 brings AC line source power into a device electromagnetically coupled to the standardized powerline connector 108. In other embodiments, AC line source power (i.e., utility power) may be arranged as a powerline source providing 120 VAC, 208 VAC, 220 VAC, 240 VAC, 260 VAC, 277 VAC, 360 VAC, 415 VAC, 480 VAC, 600 VAC, or some other power source voltage.

Figure 3:
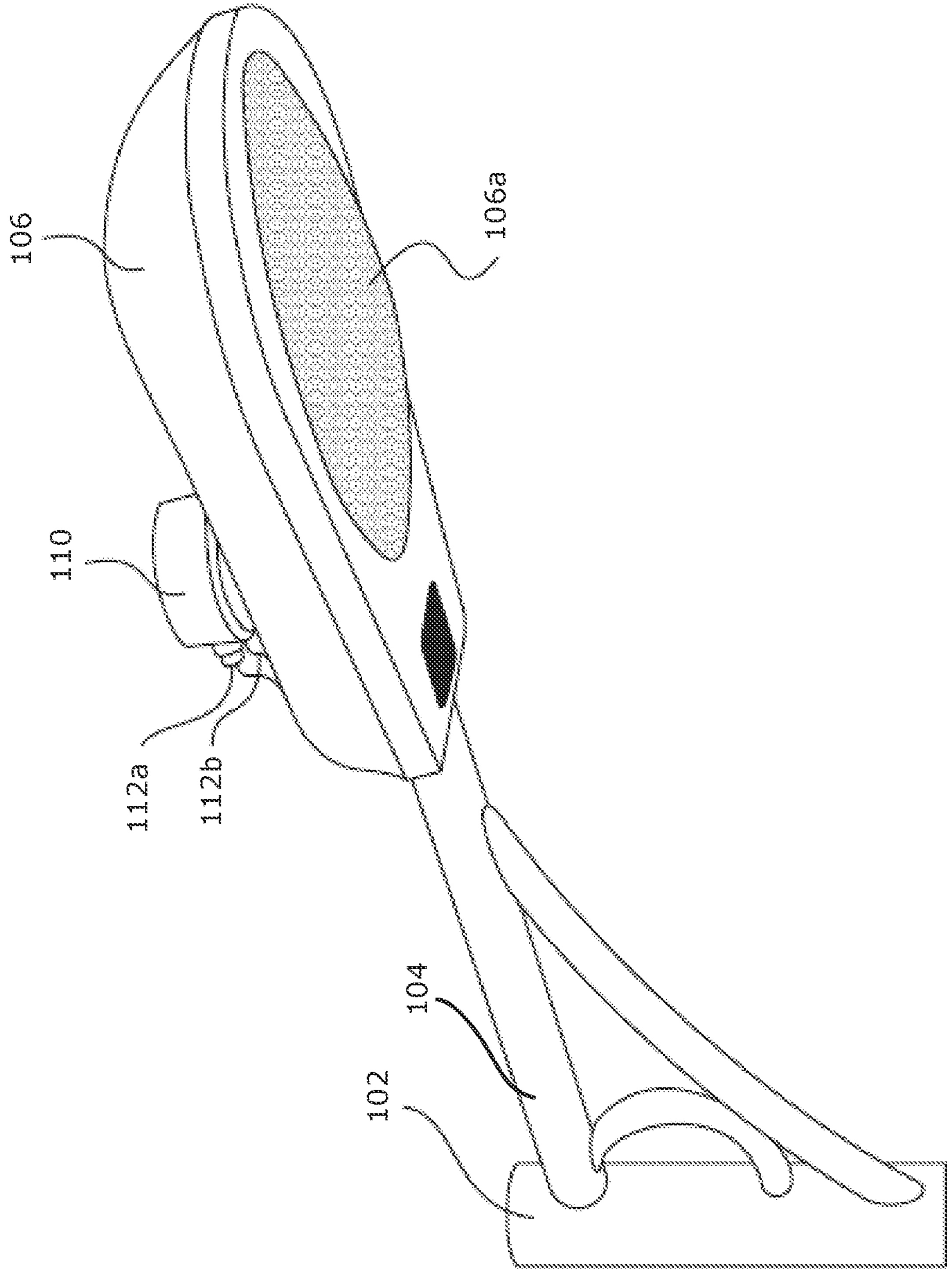
FIG. 3 is an aerial control fixture embodiment mounted on a streetlight luminaire, which itself is coupled to a utility pole.

FIG. 3 is an aerial control fixture 110 embodiment mounted on a streetlight luminaire 106, which itself is coupled to a utility pole 102. The aerial control fixture 110 of FIG. 3 is arranged as a small cell networking device, but in other embodiments, the aerial control fixture 110 is arranged as a smart sensor device 110A (FIG. 4), a small cell, some other wireless networking device, a combination device, or some other control device. The streetlight luminaire 106 includes a light source 106*a*. The light source 106*a* may be an incandescent light source, a light emitting diode (LED) light source, a high pressure sodium lamp, or any other type of light source. In the aerial control fixture 110 of FIG. 3, the aerial control fixture 110 is coupled to the luminaire 106 via a standardized powerline connector. That is, the pins of a standardized powerline connector are electromechanically coupled to a compatible standards-based receptacle portion of the standardized powerline connector 108 integrated into the luminaire 106. In some cases, the aerial control fixture 110 replaces or otherwise takes the place of a different light sensor device, which does not have the features provided by the aerial control fixture 110. Optional cables 112*a*, 112*b* are passed through twist lock connectors of the aerial control fixture 110. The cables 112*a*, 112*b* may be networking cables (e.g., Power over Ethernet (PoE)) cables, cables electrically coupled to other electronic circuits (e.g., cameras, transducers, weather devices, internet of things (IoT) devices, or any other type of device).

Figures 4A, 4B, 4C, 4D, 4E, 4F, 4G, 4H:
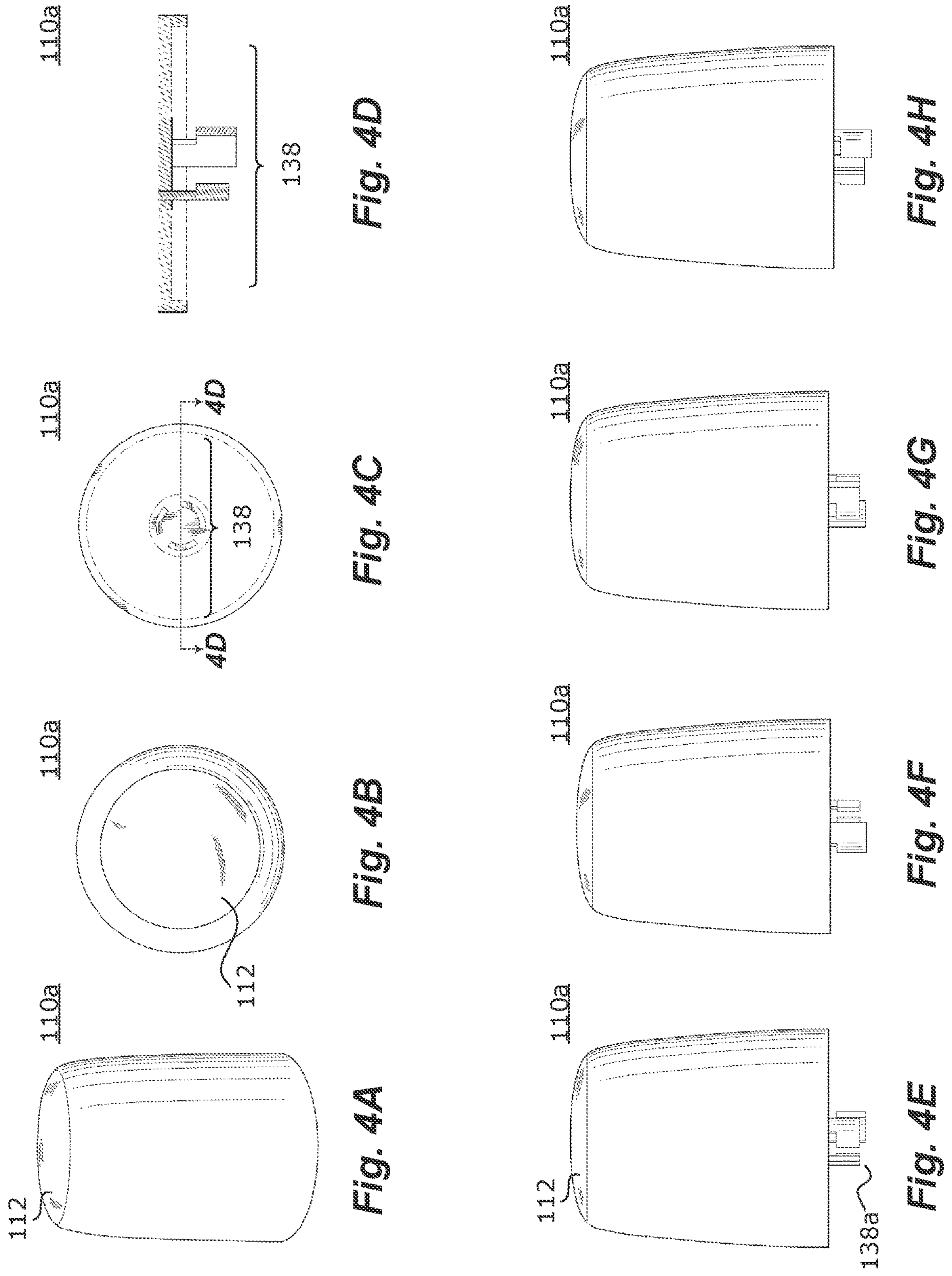
FIGS. 4A-4H are various views of an aerial control fixture embodiment having a floating connector.

FIGS. 4A-4H are various views of an aerial control fixture 110*a* embodiment having a floating connector 138. The aerial control fixture embodiment of FIG. 4 is arranged as a smart sensor device. FIG. 4A is a perspective view of the aerial control fixture 110*a* embodiment. FIGS. 4B and 4C are top and bottom views, respectively, of the aerial control fixture 110*a* embodiment. FIG. 4D is a cross-sectional view of the aerial control fixture 110*a* embodiment across 4D-4D in FIG. 4C. FIGS. 4E-4H are front, right side, rear, and left side views of the aerial control fixture 110*a* embodiment.

The first aerial control fixture 110*a* embodiment of FIG. 4 includes a light sensor module 112. The first aerial control fixture 110*a* may also include non-cellular-based wireless capabilities (e.g., WiFi, Bluetooth, etc.), local edge processing capabilities, and other features. In this way, the first aerial control fixture 110*a* may work as a traditional light sensor for its associated light source, and the first aerial control fixture 110*a* may provide other "smart" services. The first aerial control fixture 110*a*, for example, may receive directions or other control information from a small cell networking device, from a mobile device, from another first aerial control fixture 110*a*, or from some other source. The first aerial control fixture 110*a* may also have one or more embedded algorithms that direct operations of an associated light source such as variable illumination based on time, season, external conditions, motion detection, sound detection, or the like. The first aerial control fixture 110*a* may have one or more sensors coupled thereto that provide actionable sensor input data that is used to control the associated light source. In still other cases, the first aerial control fixture 110*a* is arranged as a WiFi access point, a WiFi point in a mesh network, or some other wireless data gateway.

The first aerial control fixture 110*a* embodiment of FIG. 4 may be coupled directly to a light fixture, or the first aerial control fixture 110*a* embodiment may be coupled to another device such as a second aerial control fixture embodiment, which is arranged as a small cell or other wireless networking device.

As identified in the bottom view of FIG. 4C, the aerial control fixture 110*a* embodiment includes a floating connector 138. The floating connector 138 has a primary connector portion 138*a* (FIG. 4E) and a secondary connector portion (not shown in FIG. 4).

The primary connector portion 138*a* (FIG. 4E) in some cases is compliant with a particular standard. In some cases, the primary connector portion 138*a* is a multi-pin NEMA connector that is compliant with an ANSI C136.41 standard. In other cases, the primary connector portion 138*a* is compliant with a different ANSI standard or some other standard altogether (e.g., a Zhaga connector). As represented in the present disclosure, the primary connector portion 138*a* is arranged as a set of pins of a particularly selected size and shape arranged in a generally circular pattern about a first central axis that is substantially normal to a first planar surface. It is contemplated, however, that in some embodiments, the primary connector portion 138*a* is arranged as a set of receptacles, a set of pads, a combination of pins and receptacles, or some other means.

The secondary connector portion of floating connector 138*a* is illustrated and described in and with respect to other figures of the present disclosure. In the present disclosure, the secondary connector portion is integrated with or otherwise arranged proximate to the primary connector portion 138*a*. The two portions may be integrated in a same housing, a same plane, parallel planes, or in any other desirable manner. In the present disclosure, the secondary connector portion 138*a* may be referred to as a substructure integrated with the floating connector, a tilt mechanism, a floating means, or some other like term.

To simplify the drawings of FIG. 4, various elements of the aerial control fixture 110*a* embodiment arranged as a smart sensor device may not be specifically shown, identified, or referenced in each illustration. For example, the light sensor module 112 is identified and referenced in FIGS. 4A, 4B, and 4E, but the light sensor module 112 is not identified in FIGS. 4C-4D, 4F-4H even though it is present and its location is readily apparent. Other structural elements in FIG. 4 and other figures of the present disclosure may also be simplified in this way.

Figure 5A:
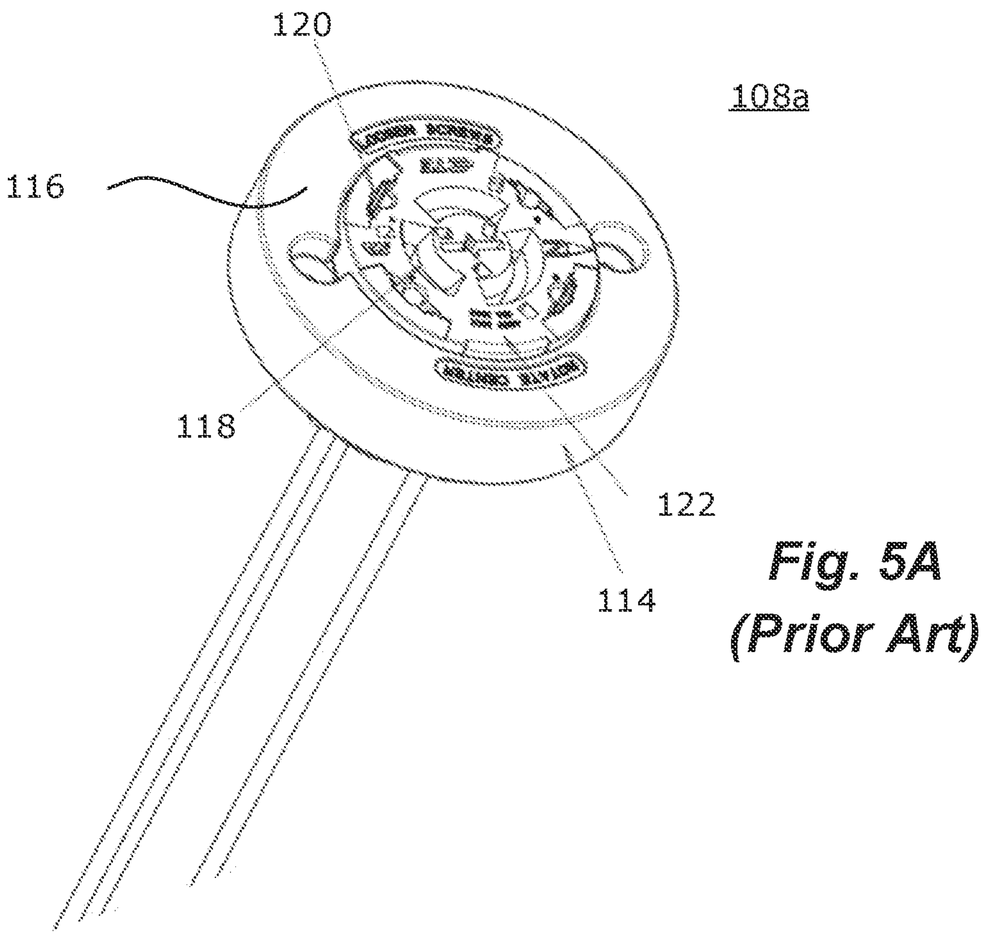
Fig. 5A (Prior Art)
FIGS. 5A-5B are a conventional standards-based female connector embodiment.
Figure 5B:
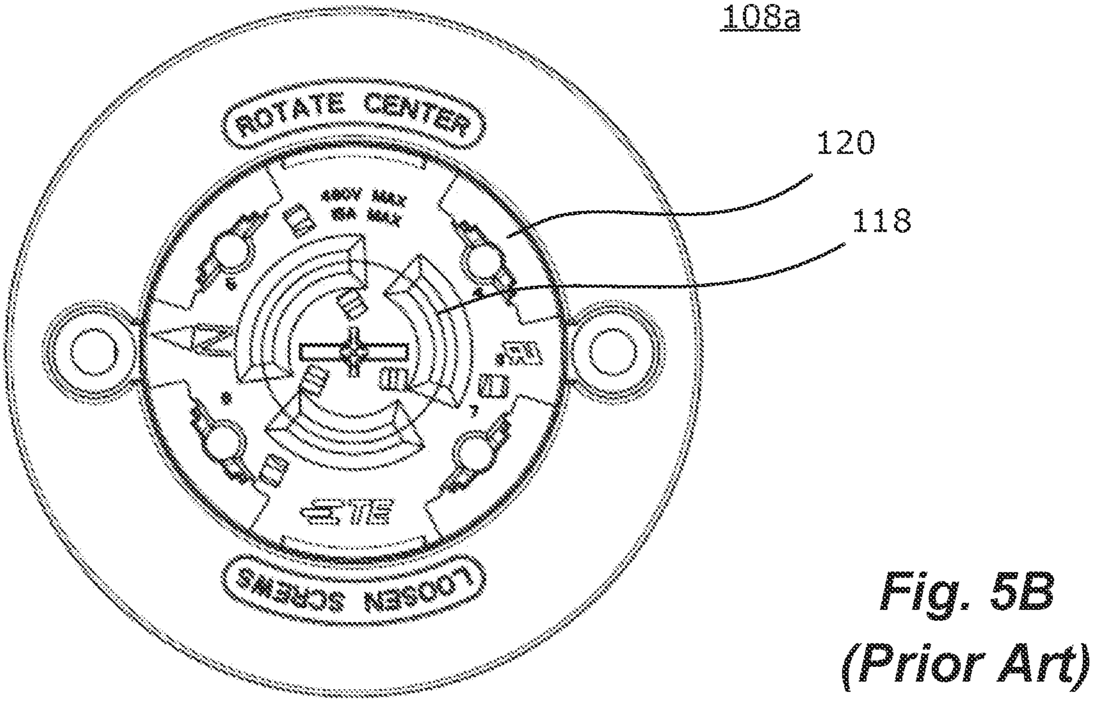
Fig. 5B (Prior Art)

FIGS. 5A-5B are a conventional standards-based female connector 108*a* embodiment. In at least some cases, the conventional standards-based female connector 108*a* may also be referred to as a standardized powerline connector. The conventional standards-based female connector 108*a* embodiment of FIG. 5 is compliant with a NEMA American National Standard directed toward Roadway and Area Lighting Equipment (i.e., ANSI C136) such as ANSI C136.41, ANSI C136.41-2013. The conventional standards-based female connector 108*a* includes a short, generally cylindrical housing 114 and a set of three electrical contacts recessed into a substantially planar surface region 116 of the connector 108*a*. Only one of the receptacles 116 of the set of electrical contacts is identified to avoid unnecessarily obscuring the figure. The set of electrical contacts is arranged about a central access, the central axis being substantially normal to the substantially planar surface region 116. It is evident in FIG. 5 that the electrical contacts 118 are fixedly and a movably integrated into the short, generally cylindrical housing 114 of the conventional standards-based female connector 108*a*.

Optionally, the conventional standards-based female connector 108*a* may also include a set of dimming contacts. Only one dimming contact 120 of four dimming contacts in the embodiment is identified to avoid unnecessarily obscuring the figure. In some cases, the conventional standards-based female connector 108*a* will have zero dimming contacts, two dimming contacts, four dimming contacts, or some other number of dimming contacts.

Optionally, the conventional standards-based female connector 108*a* may include any suitable amount and form of descriptive information 122 (e.g., legends, warnings, icons, and the like). Such information may include directions for aligning (e.g., "ROTATE CENTER") the connector, directional information (e.g., "N") for such alignment, electrical limitations (e.g., maximum voltage, maximum current, and the like), numerical reference number information for one or more of the electrical contacts, and the like.

Figure 6A:
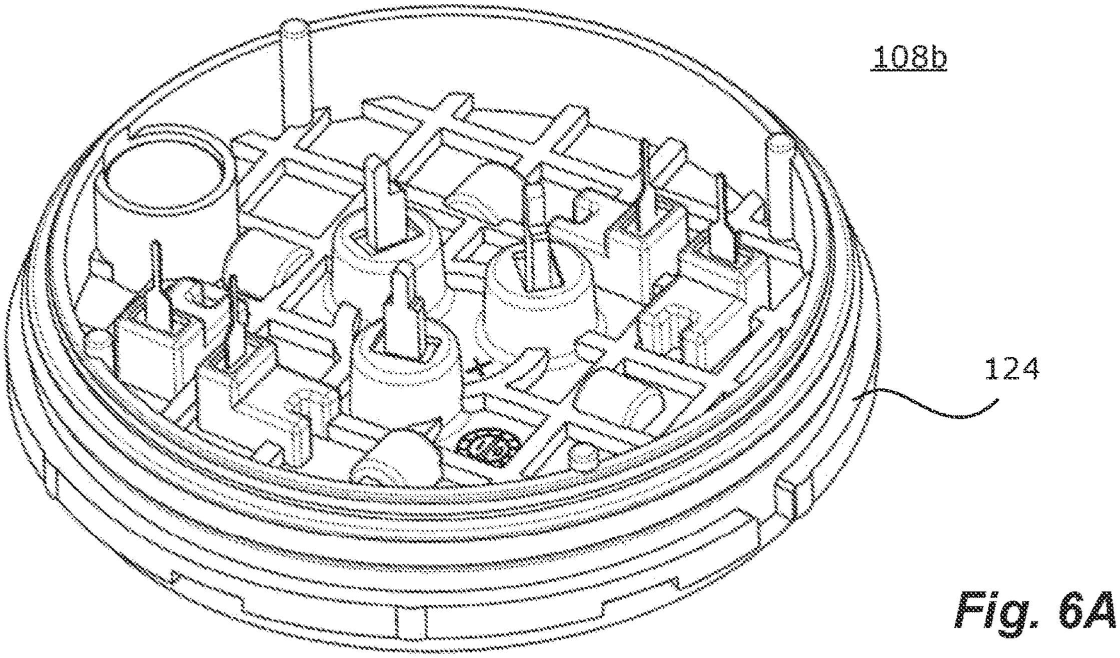
Fig. 6A (Prior Art)
FIGS. 6A-6B are a conventional standards-based male connector embodiment.
Figure 6B:
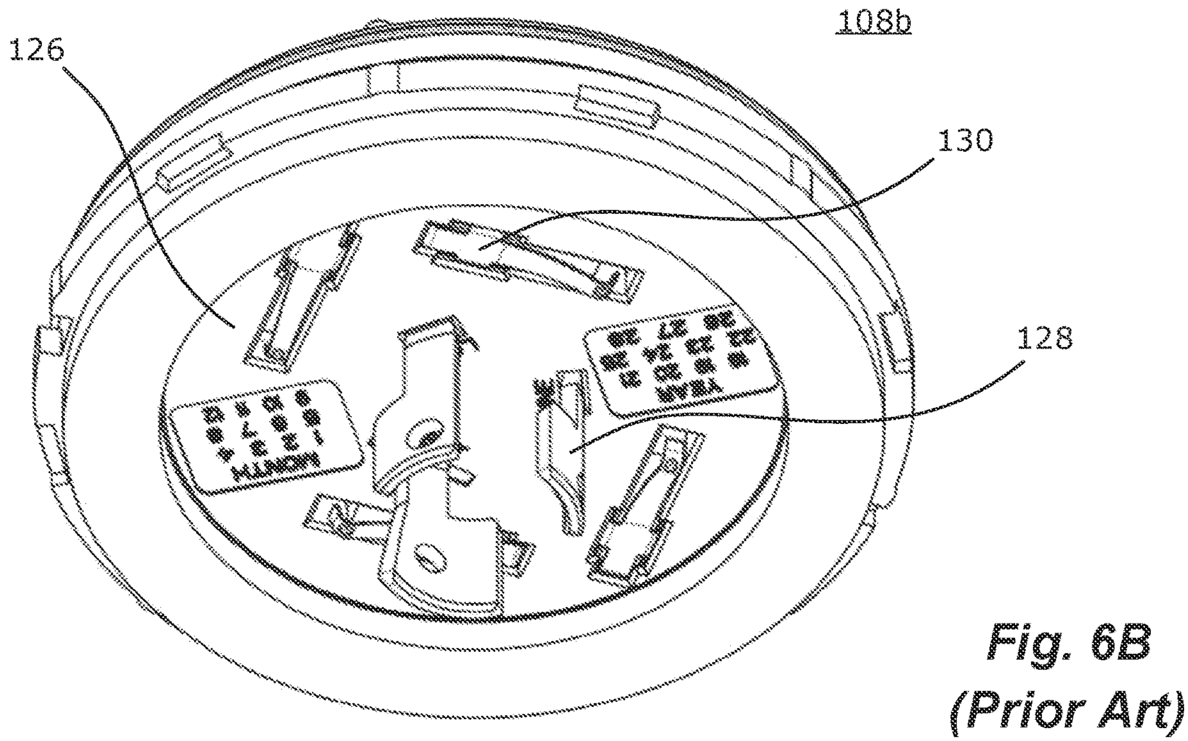
Fig. 6B (Prior Art)

FIGS. 6A-6B are a conventional standards-based male connector 108*b* embodiment. In at least some cases, the conventional standards-based male connector 108*b* may also be referred to as a standardized powerline connector. The conventional standards-based male connector 108*b* embodiment of FIG. 6 is compliant with a NEMA American National Standard directed toward Roadway and Area Lighting Equipment (i.e., ANSI C136) such as ANSI C136.41, ANSI C136.41-2013. The conventional standards-based male connector 108*b* includes a short, generally cylindrical housing 124 and a set of three electrical contacts protruding from a substantially planar surface region 126 of the connector 108*b*. Only one of the protruding of electrical contacts 126 (e.g., pins, blades, or the like) of the set of electrical contacts is identified to avoid unnecessarily obscuring the figure. The set of electrical contacts is arranged about a central access, the central axis being substantially normal to the substantially planar surface region 126.

Optionally, the conventional standards-based male connector 108*b* may also include a set of dimming contacts. Only one dimming contact 130 of four dimming contacts in the embodiment is identified to avoid unnecessarily obscuring the figure. In some cases, the conventional standards-based male connector 108*b* will have zero dimming contacts, two dimming contacts, four dimming contacts, or some other number of dimming contacts.

Optionally, the conventional standards-based female connector 108*a* may include any suitable amount and form of descriptive information (e.g., legends, warnings, icons, and the like). Such information may include directions for aligning the connector, directional information for such alignment, electrical limitations, numerical reference number information for one or more of the electrical contacts, and the like.

Figure 6C:
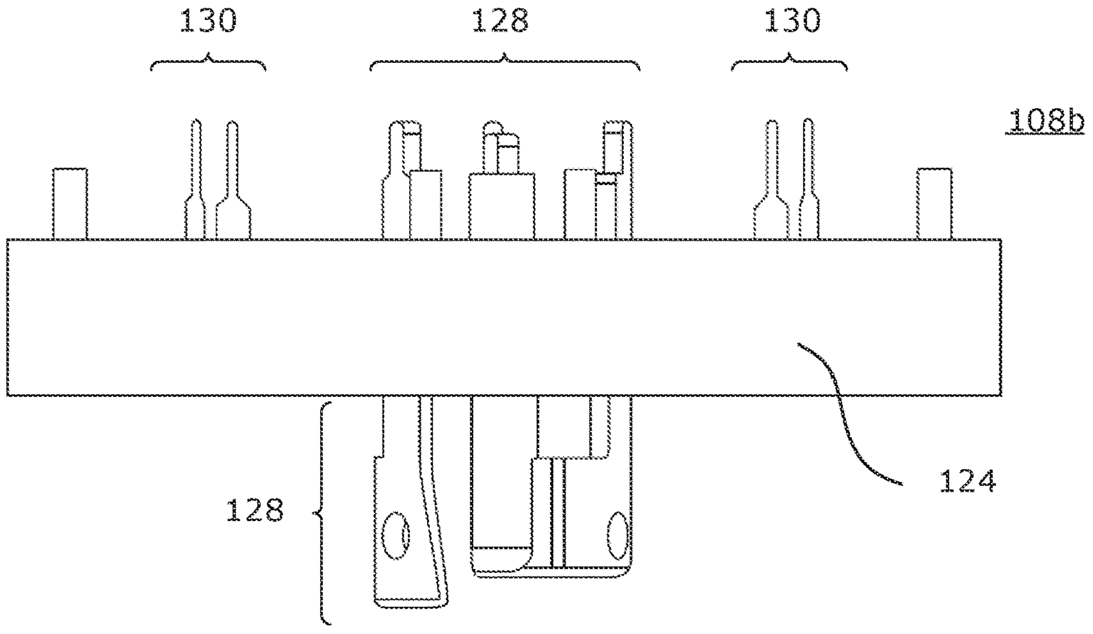
Fig. 6C (Prior Art)
FIGS. 6C-6D are a side view and cutaway side view, respectively, of the conventional standards-based male connector.
Figure 6D:
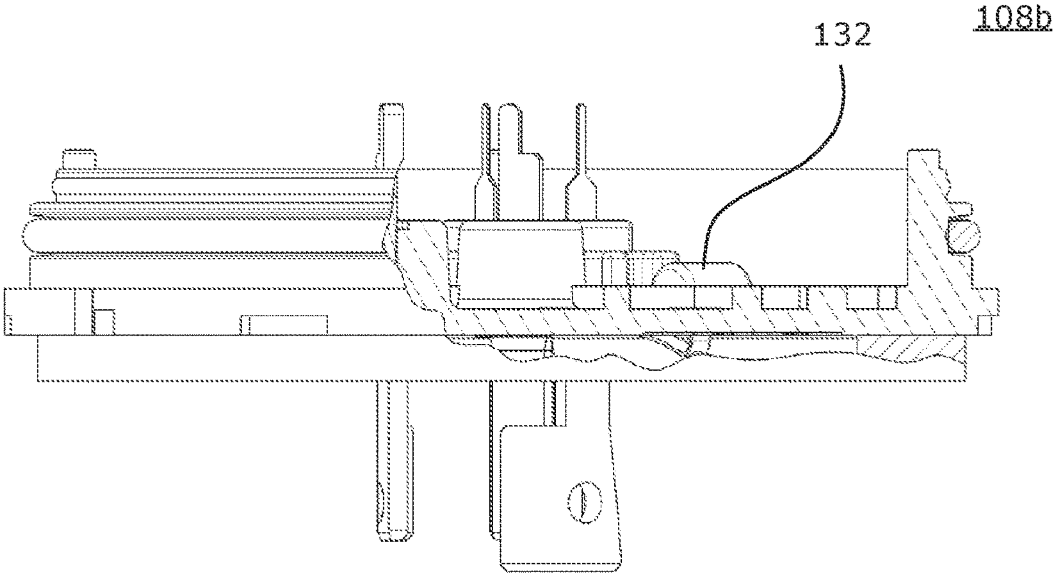
Fig. 6D (Prior Art)

FIGS. 6C-6D are a side view and cutaway side view, respectively, of the conventional standards-based male connector 108*b*. Various ones of the structures identified in FIGS. 6A-6B are also identified in FIGS. 6C-6D. In the cutaway side view of FIG. 6D, certain electronic circuitry 132 (e.g., one or more fuses, regulators, switches, rectifiers, and the like) is identified. It is further evident in FIG. 6 that the electrical contacts 128 are fixedly and a movably integrated into the short, generally cylindrical housing 124 of the conventional standards-based male connector 108*b*.

Figure 7A:
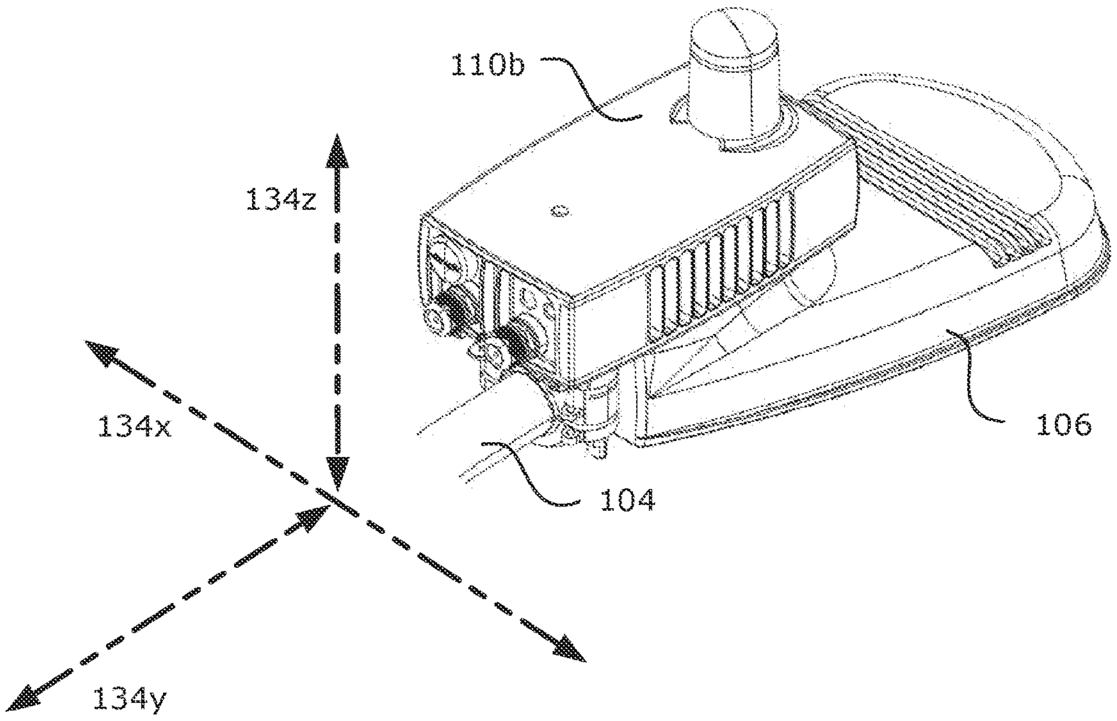
FIGS. 7A-7B are various views of another aerial control fixture embodiment having a floating connector.
Figure 7B:
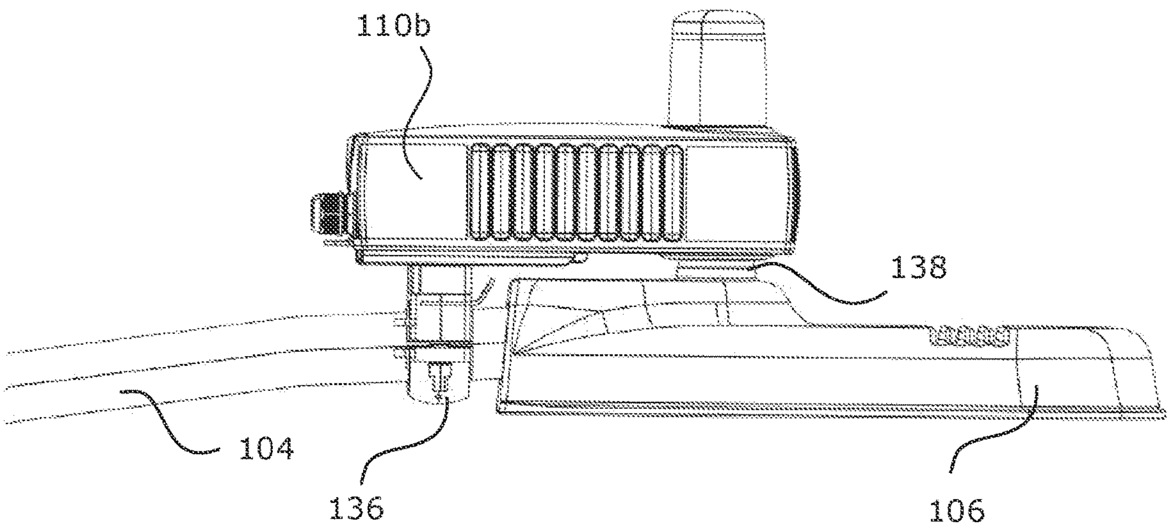

FIGS. 7A-7B are various views of another aerial control fixture 110*b* embodiment having a floating connector 138. A utility pole (not shown in FIG. 7) has a support arm 104 with a luminaire 106 attached thereto. The aerial control fixture 110*b* is electromechanically coupled to a luminaire 106 via the floating connector 138 and a certain clamp 136.

In FIG. 7, three axes are illustrated: an X-axis 134*x*, a Y-axis 134*y*, and a Z-axis 134*z*. It is evident in FIG. 7 that the aerial control fixture 110*b* is symmetrically aligned in all three axes with the support arm 104 and the luminaire 106. In such cases, a floating connector 138 is deployed, but a conventional connector (e.g., standardized powerline connector, conventional standards-based female connector 108*a*, conventional standards-based male connector 108*b*) could have also been used. In other cases, for example, where an aerial control fixture, a luminaire, and a support are not symmetrically aligned (see, for example, FIGS. 14-15), if a conventional connector is used, than the misaligned components would apply significant stress to the connector.

Figure 8A:
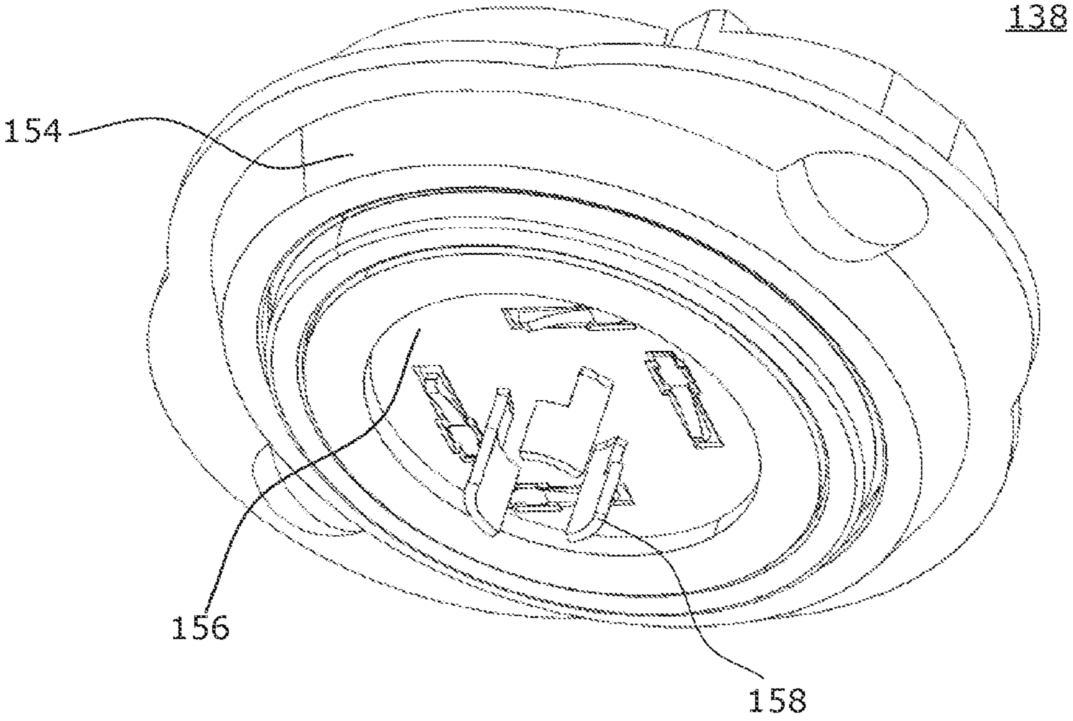
FIG. 8A is an axonometric view of a floating connector embodiment.
Figure 9A:
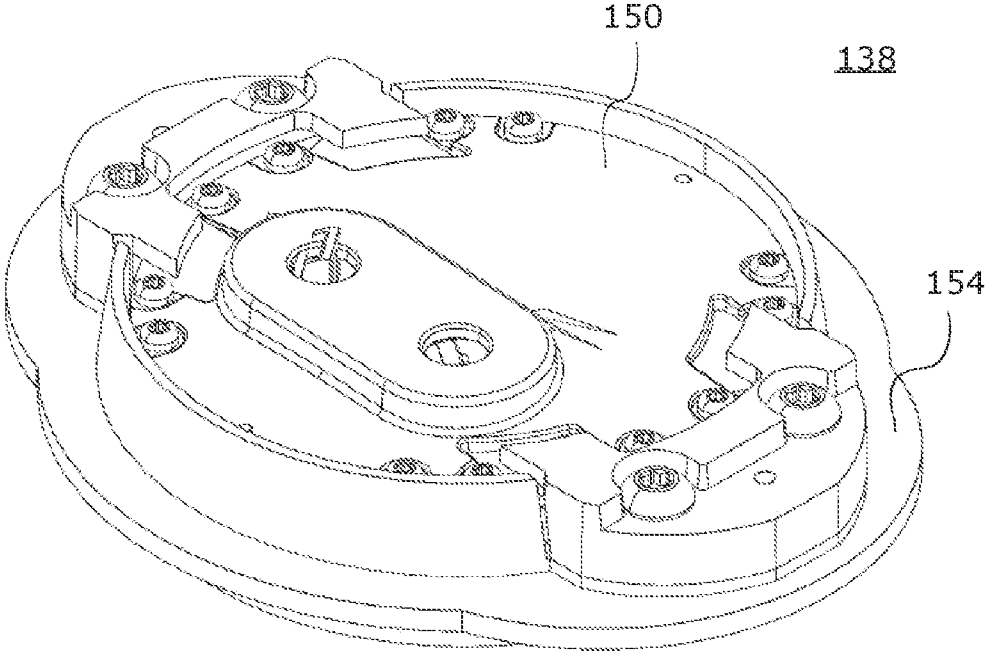
FIG. 9A is another axonometric view of a floating connector embodiment.

FIG. 8A is a first axonometric view of a floating connector 138 embodiment. FIG. 9A is another axonometric view of the floating connector 138 embodiment of FIG. 8A from a different perspective. Various floating connector embodiments described in the present disclosure may optionally permit a primary portion of the connector to float in one direction, two directions, or three directions. The range of motion in any particular direction may be desirably set in a range of up to about one degree (1°), up to about two degrees (2°), up to about three degrees (3°), up to about five degrees (5°), up to about ten degrees (10°), or by some other range. Such a motion, which may also be referred to as float, is a rotational motion about one or more of an X-axis, a Y-axis, and a Z-axis. The range of motion may be in a single positive direction, a single negative direction, or both a positive and negative direction.

Figure 8B:
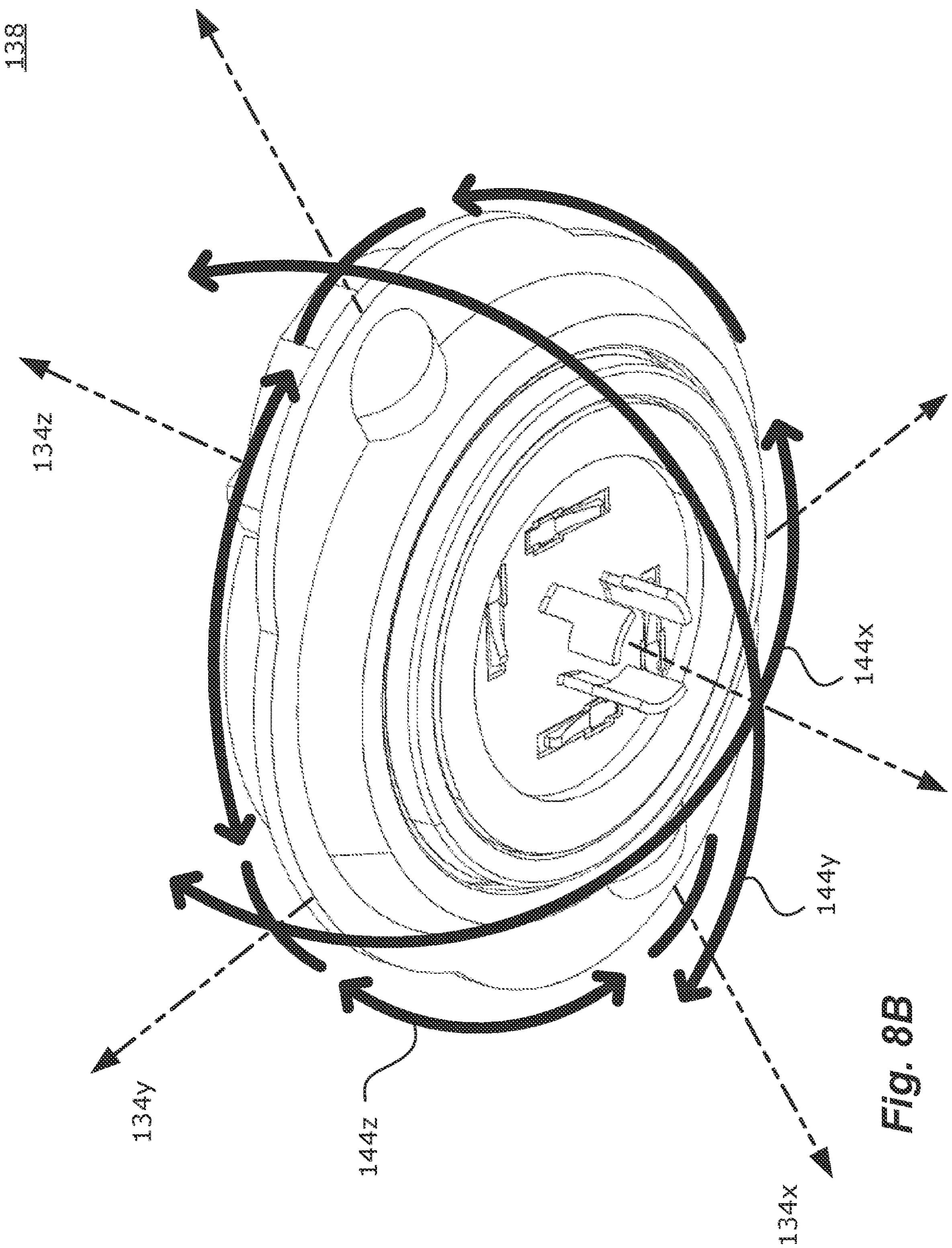
FIG. 8B is the floating connector of FIG. 8A showing several directions of motion.

FIG. 8B is the floating connector 138 of FIG. 8A showing several directions of motion. In the embodiment, a first set of electrical contacts protrude from a first substantially planar surface. The first set of electrical contacts are arranged about a first central access which is substantially normal to the first substantially planar surface. The first set of electrical contacts in the first substantially planar surface are movably isolated from at least a portion of the outer housing that envelops the contacts and planar surface.

A first X-axis 134$x$ is represented in FIG. 8B along with a corresponding range of rotational motion about the X-axis 144$x$. A second Y-axis 134$y$ is represented in FIG. 8B along with a corresponding range of rotational motion about the Y-axis 144$y$. A third Z-axis 134$z$ is represented in FIG. 8B along with a corresponding range of rotational motion about the Z-axis 144$z$. In some cases, a floating connector 138 optionally provides positive range stops in one or more of the directions of rotation. In some cases, a floating connector 138 optionally permits rotational motion in only one direction; in some cases, rotational motion is optionally permitted in only two directions; and in some cases, rotational motion is optionally permitted in all three directions.

Figure 8C:
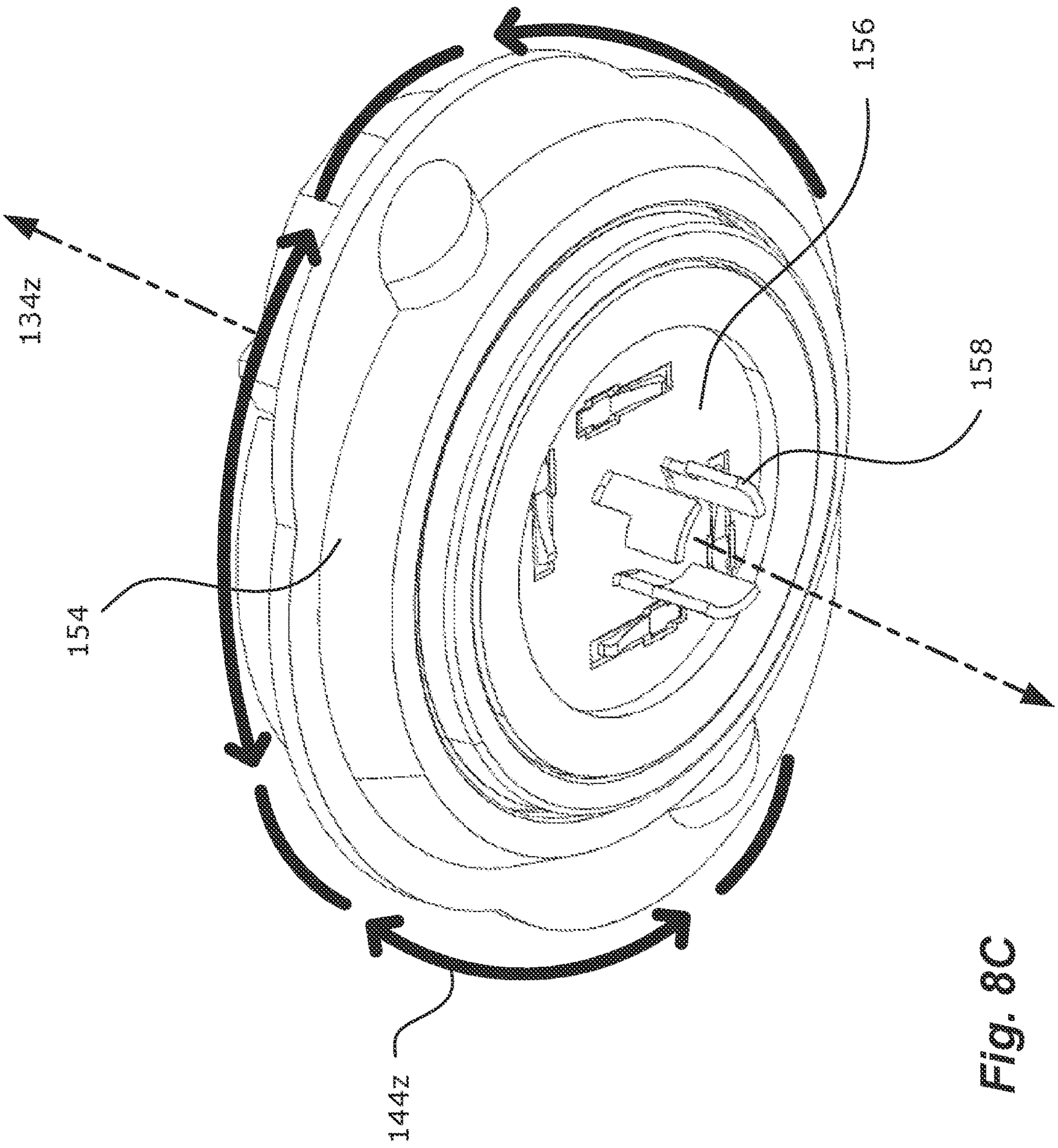
FIG. 8C is the floating connector of FIGS. 8A-8B showing a first rotational motion of a tilt housing relative to the set of male electrical contacts.
Figure 8D:
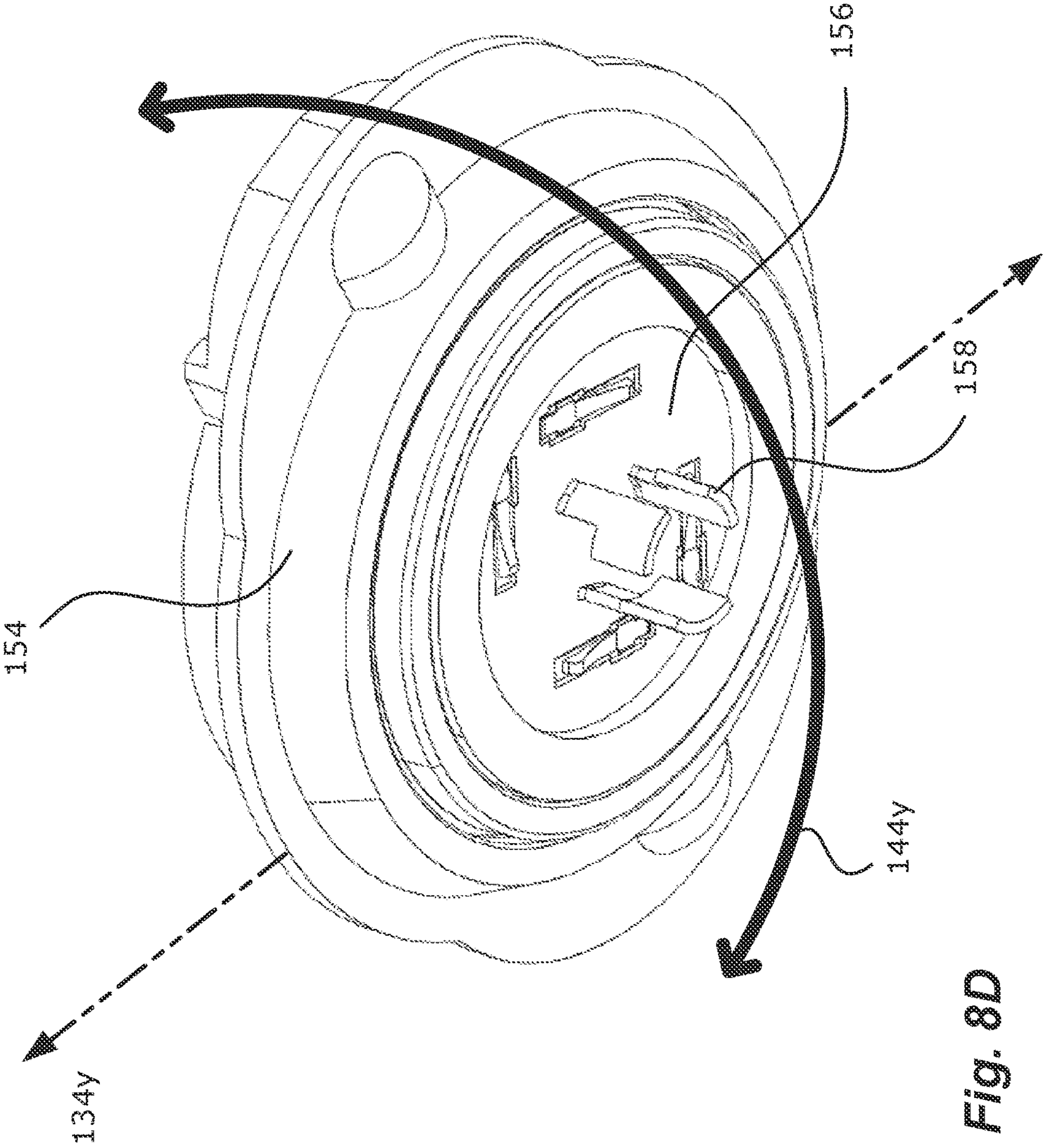
FIG. 8D is the floating connector of FIGS. 8A-8B showing a second rotational motion of the tilt housing relative to the set of male electrical contacts.
Figure 8E:
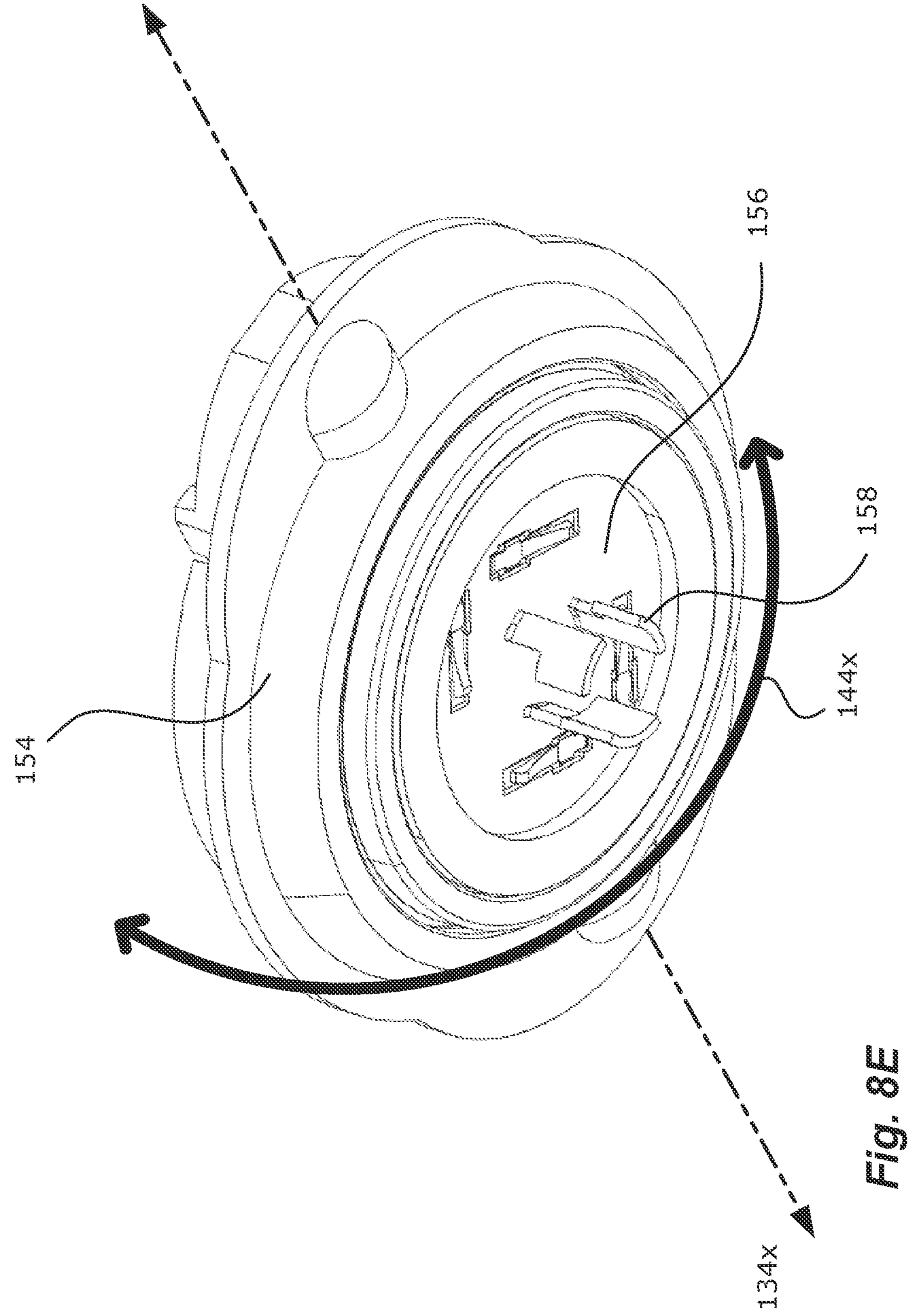
FIG. 8E is the floating connector of FIGS. 8A-8B showing a third rotational motion of the tilt housing relative to the set of male electrical contacts.

To assist one of skill in the art gain a better understanding of the floating connector embodiments of the present disclosure, the rotational components of FIG. 8B are separately shown in FIGS. 8C-8E.

FIG. 8C is the floating connector 138 of FIGS. 8A-8B showing a first rotational motion 144$z$ of a tilt housing 154 about the Z-axis 134$z$ relative to the set of male electrical contacts 158 and the substantially planar surface region 156.

FIG. 8D is the floating connector 138 of FIGS. 8A-8B showing a second rotational motion 144$y$ of the tilt housing 154 about the Y-axis 134$y$ relative to the set of male electrical contacts 158 and the substantially planar surface region 156.

FIG. 8E is the floating connector 138 of FIGS. 8A-8B showing a third rotational motion 144$x$ of the tilt housing 154 about the X-axis 134$x$ relative to the set of male electrical contacts 158 and the substantially planar surface region 156.

Figure 9B:
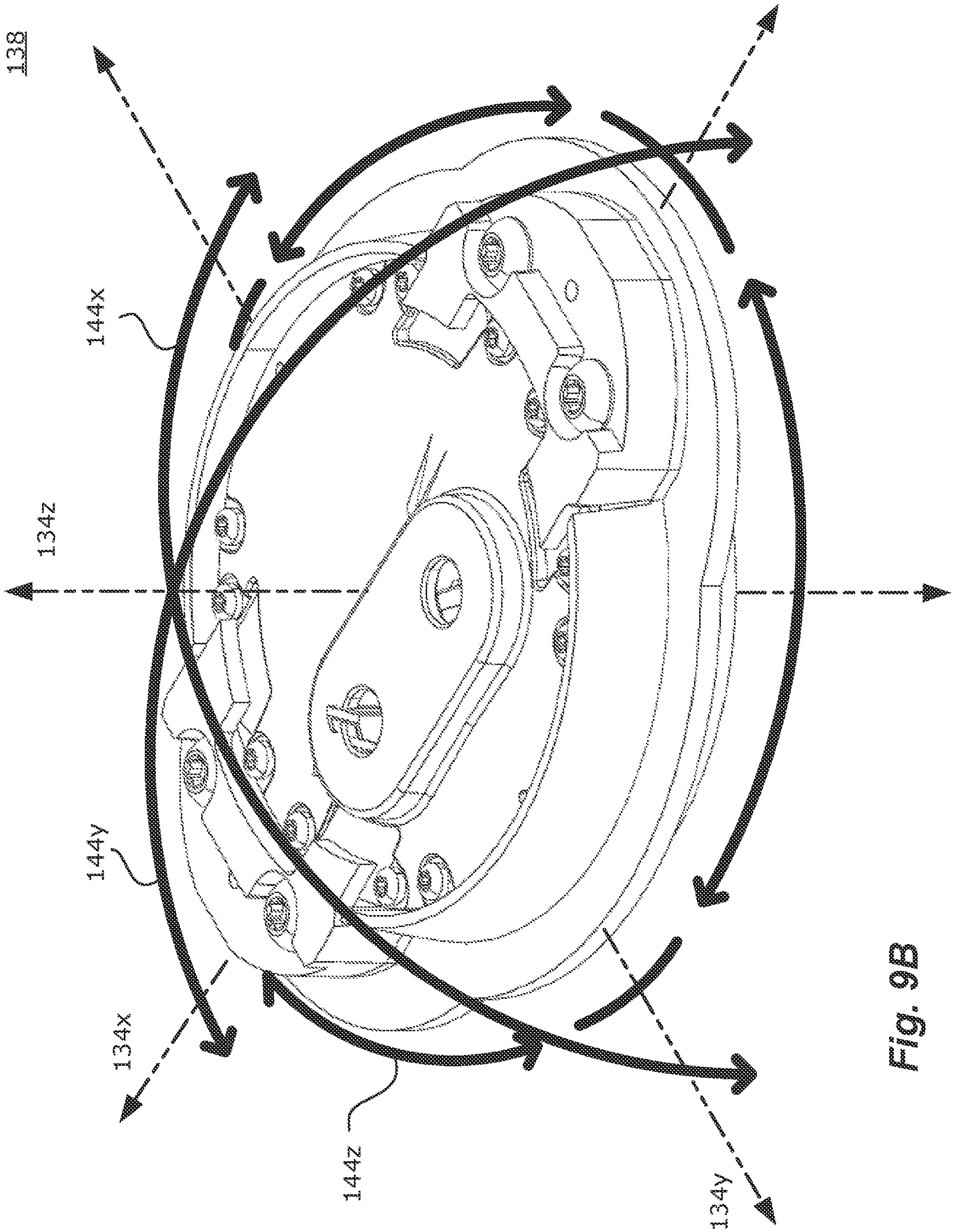
FIG. 9B is the floating connector of FIG. 9A showing several directions of motion.

FIG. 9B is the floating connector 138 of FIG. 9A showing several directions of motion. In the embodiment, which is from a top-side perspective relative to the bottom-side perspective of FIG. 8B, a substructure integrated with the floating connector 150 will move relative to the tilt housing 154. In this way, if a tilt housing 154 of a floating connector 138 is fixedly integrated with a housing of an aerial control fixture 110, or any other suitable device, the electrical contacts of the floating connector 138 will move relative to the housing of the aerial control fixture 110 or other suitable device.

The first X-axis 134$x$ (FIG. 8B) is represented in FIG. 9B along with a corresponding range of rotational motion about the X-axis 144$x$. The second Y-axis 134$y$ (FIG. 8B) is represented in FIG. 9B along with a corresponding range of rotational motion about the Y-axis 144$y$. The third Z-axis 134$z$ (FIG. 8B) is represented in FIG. 8B along with a corresponding range of rotational motion about the Z-axis 144$z$.

Figure 9C:
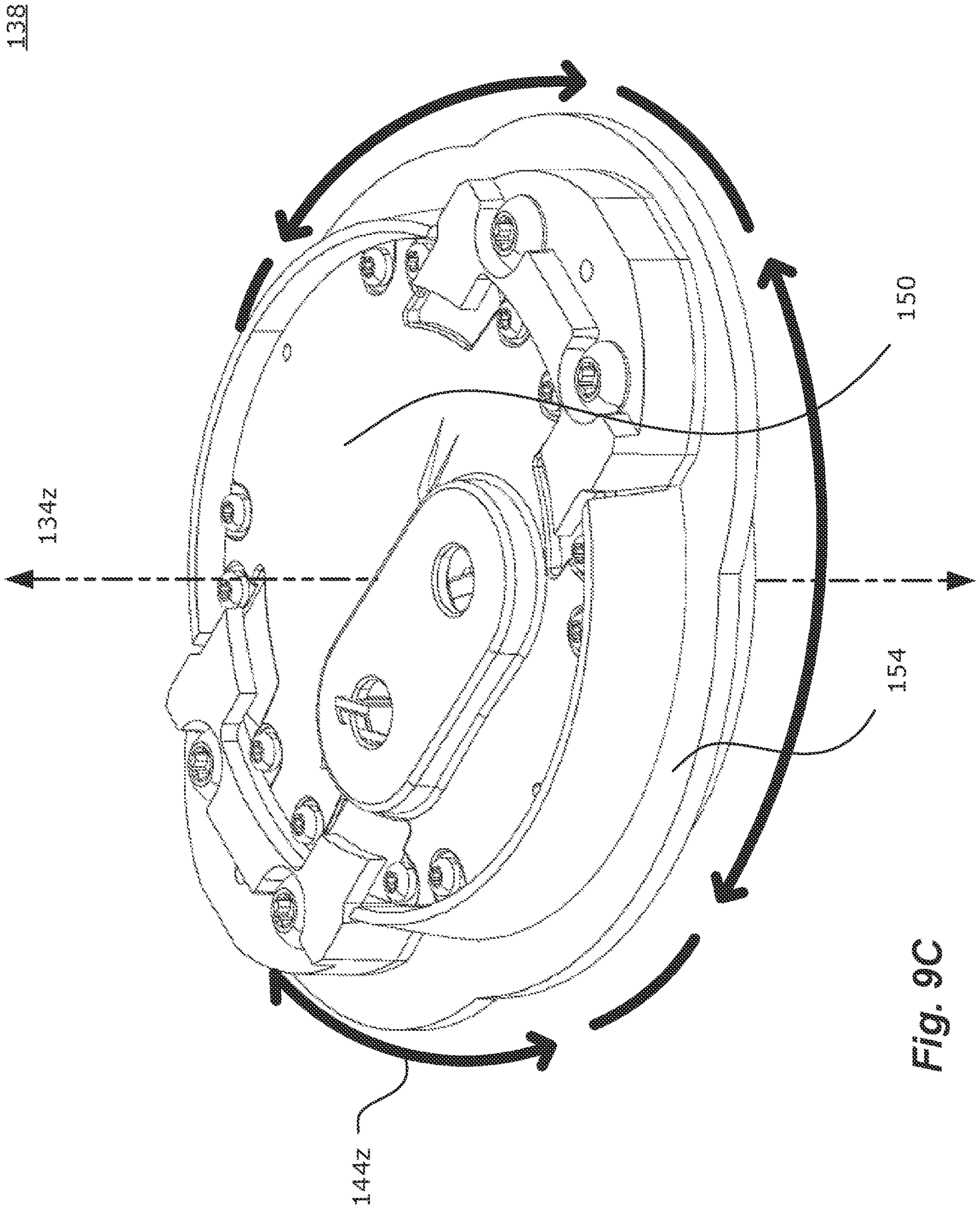
FIG. 9C is the floating connector of FIGS. 9A-9B showing a first rotational motion of a tilt housing relative to the substructure integrated with the floating connector.
Figure 9D:
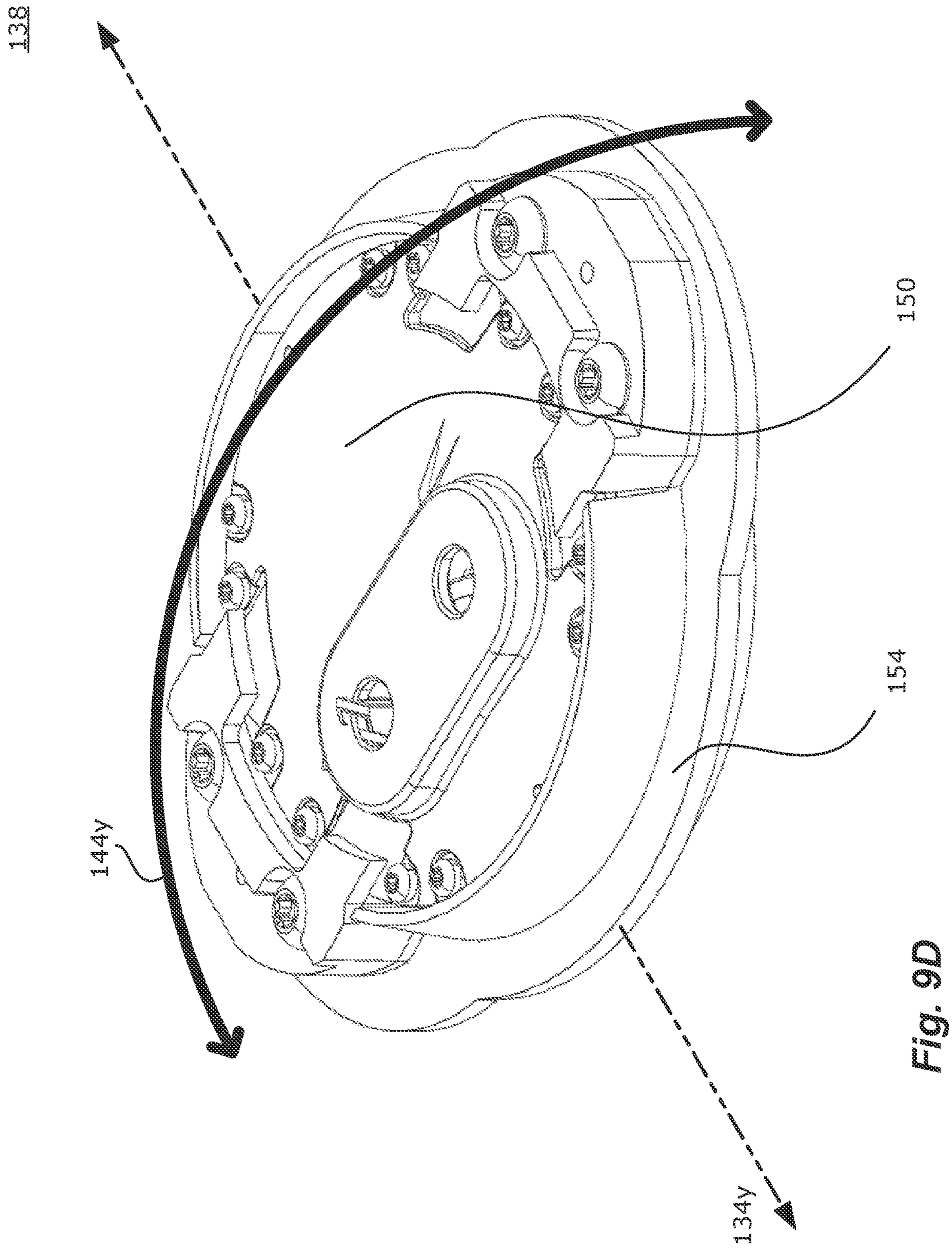
FIG. 9D is the floating connector of FIGS. 9A-9B showing a second rotational motion of the tilt housing relative to the substructure integrated with the floating connector.
Figure 9E:
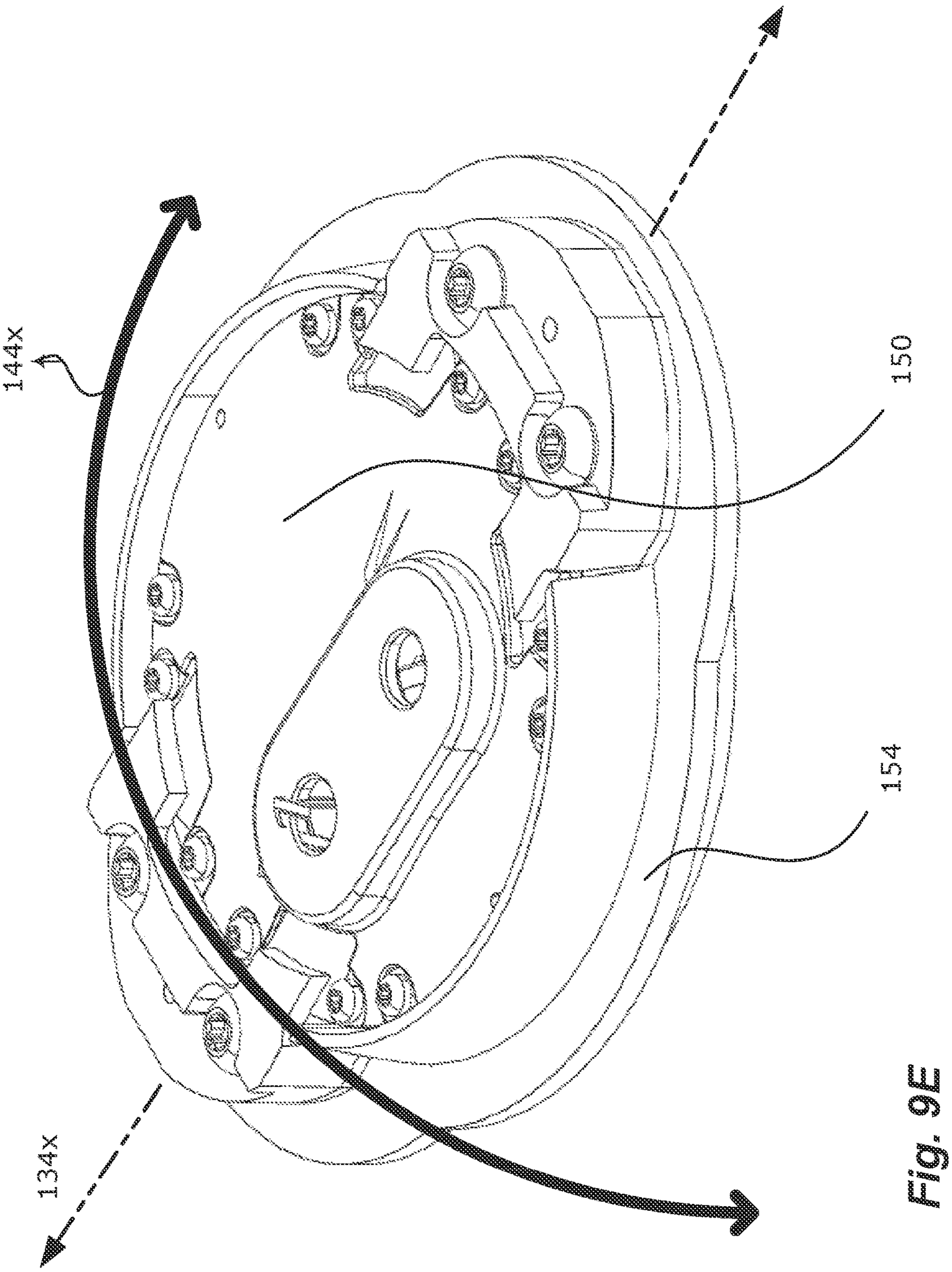
FIG. 9E is the floating connector of FIGS. 9A-9B showing a third rotational motion of the tilt housing relative to the substructure integrated with the floating connector.
Figure 10B:
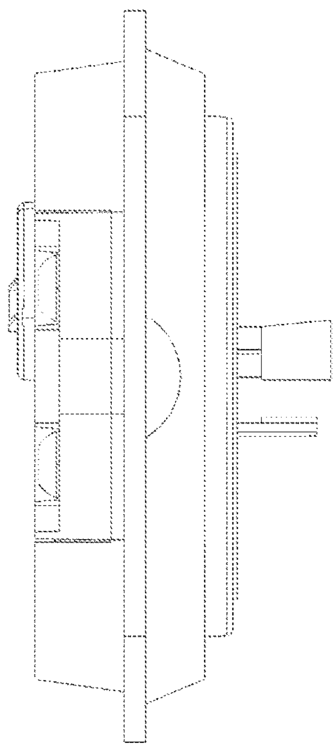
FIGS. 10A-10F are front-side, right-side, rear-side, left-side, bottom-side, and top-side views of a floating connector embodiment.
Figure 10D:
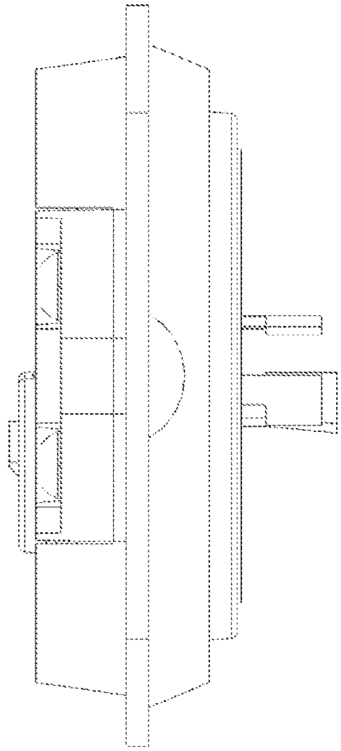
Figure 10A:
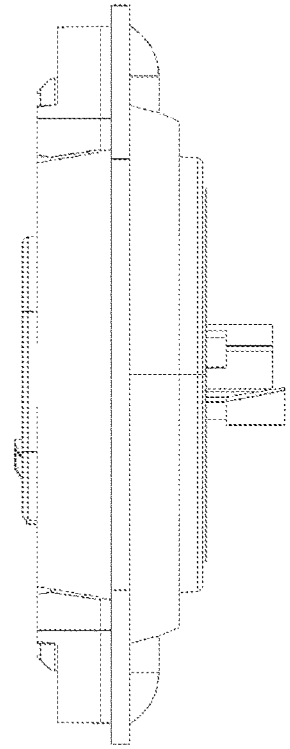
Figure 10C:
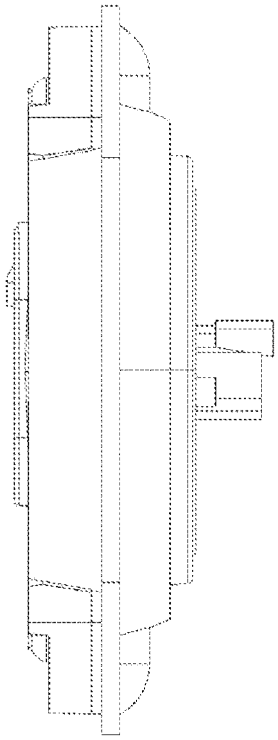
Figure 10E:
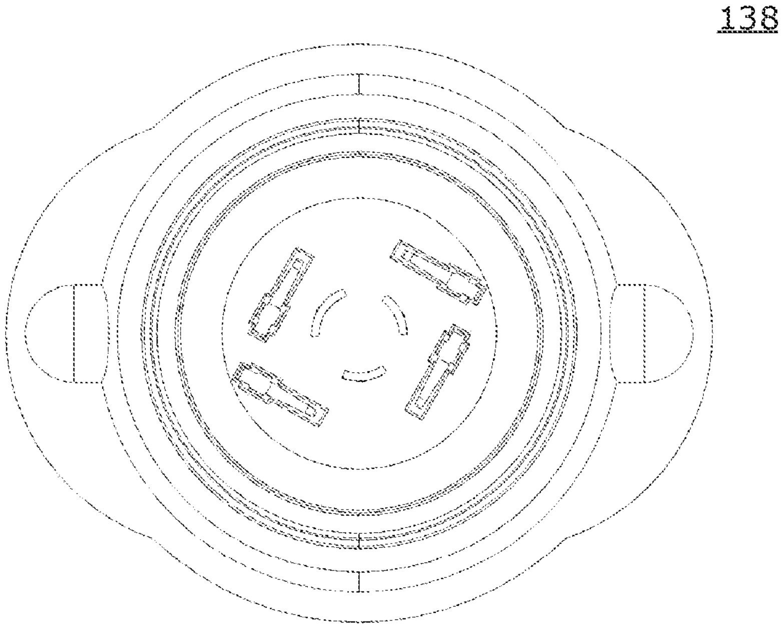
Figure 10F:
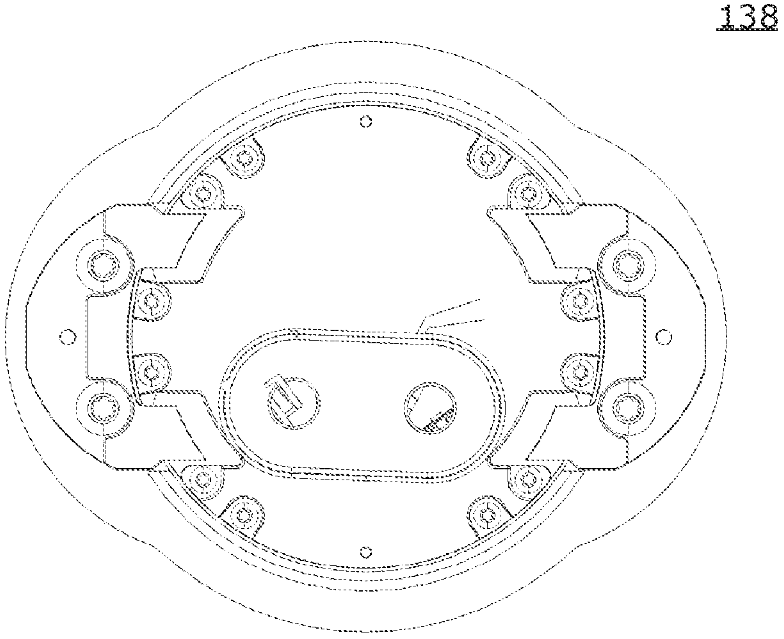

To assist one of skill in the art gain a still better understanding of the floating connector embodiments of the present disclosure, the rotational components of FIG. 9B are separately shown in FIGS. 9C-9E.

FIG. 9C is the floating connector 138 of FIGS. 9A-9B showing a first rotational motion 144$z$ of a tilt housing 154 about the Z-axis 134$z$ relative to the substructure integrated with the floating connector 150.

FIG. 9D is the floating connector 138 of FIGS. 9A-9B showing a second rotational motion 144$y$ of the tilt housing 154 about the Y-axis 134$y$ relative to the substructure integrated with the floating connector 150.

FIG. 9E is the floating connector 138 of FIGS. 9A-9B showing a third rotational motion 144$x$ of the tilt housing 154 about the X-axis 134$x$ relative to the substructure integrated with the floating connector 150.

FIGS. 10A-10F are front-side, right-side, rear-side, left-side, bottom-side, and top-side views of a floating connector 138 according to one embodiment. The floating connector 138 in FIG. 10 is along lines of the floating connector 138 described below and shown in FIGS. 11A and 12A in some embodiments. In one or more embodiments, the floating connector 138 of FIG. 10 is different from the floating connector 138 shown and described with reference to FIGS. 11A and 12A, and such differences may or may not be visible from outside of the floating connector 138. In at least one non-limiting case, for example, the floating connector 138 of FIG. 10 enables rotational motion along different or additional axes. In other case, the floating connector 138 of FIG. 10 may omit some internal, external, or internal and external features of the connector 138 presented in FIG. 11A and FIG. 12A.

Figure 11A:
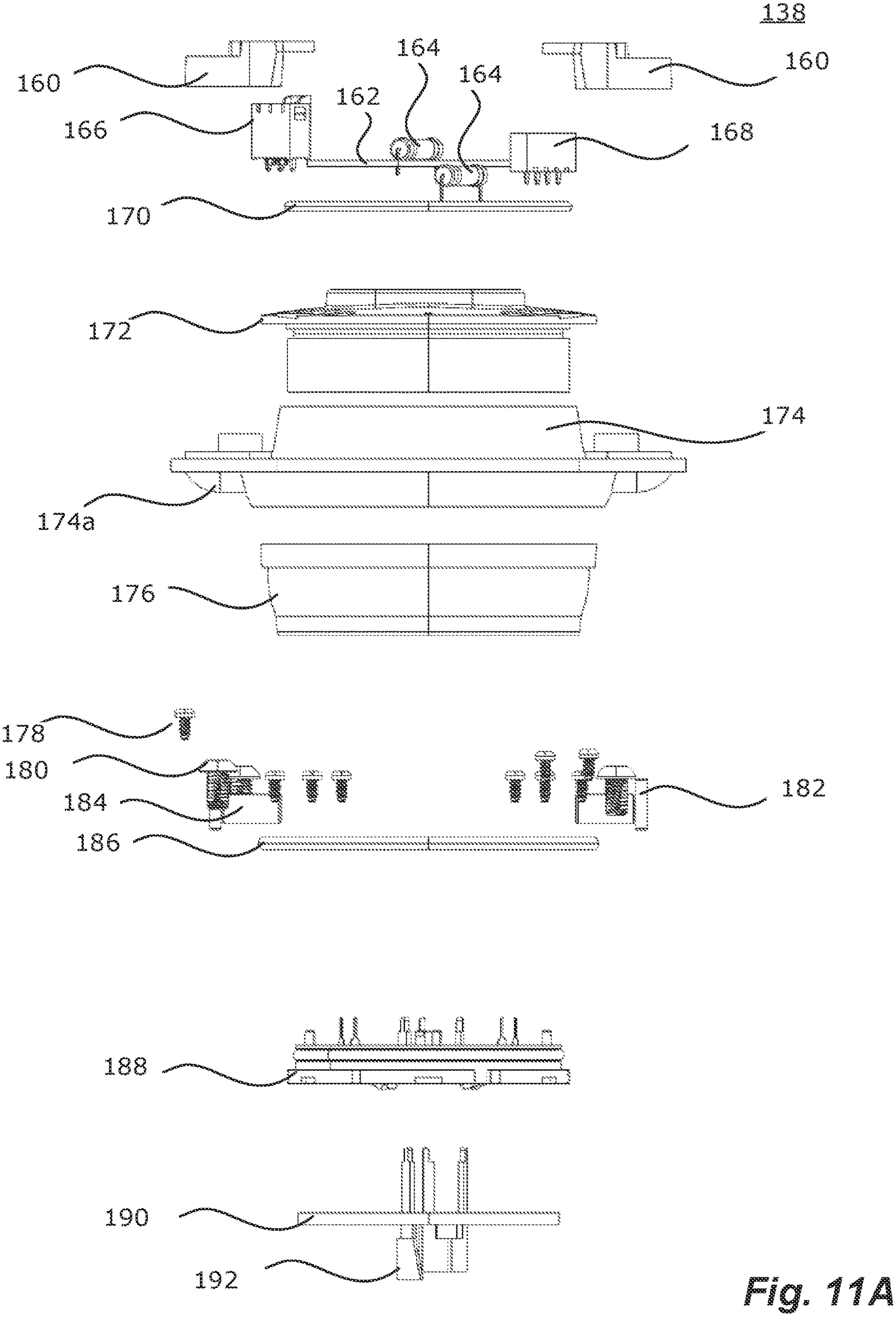
FIG. 11A is an exploded view of a floating connector embodiment.
Figure 12A:
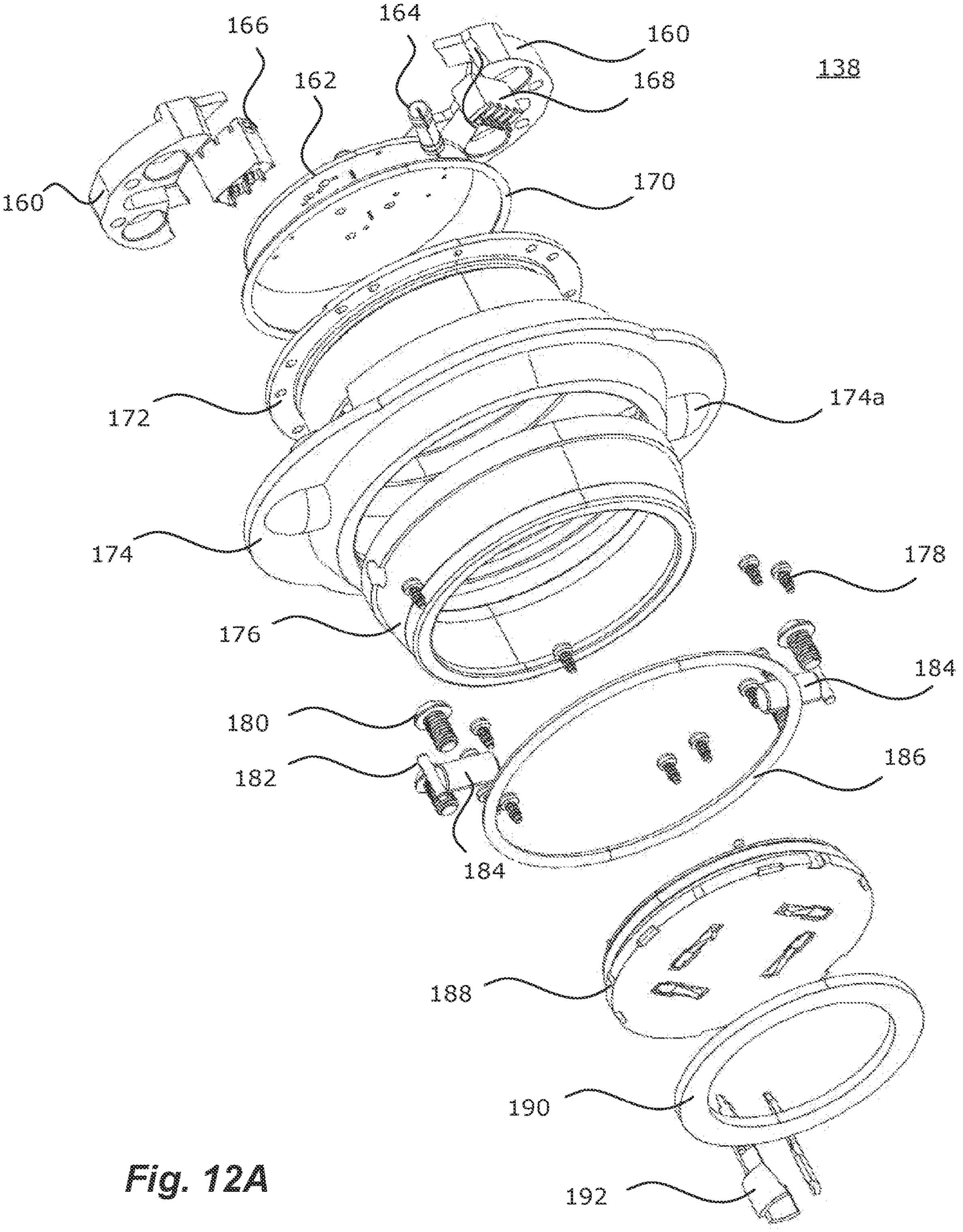
FIG. 12A is an exploded view of a floating connector embodiment from another perspective.

FIG. 11A is a first exploded view of a floating connector 138 embodiment. FIG. 12A is an exploded view of the floating connector 138 embodiment from another perspective. FIGS. 11A, 12A are described together.

Figure 11B:
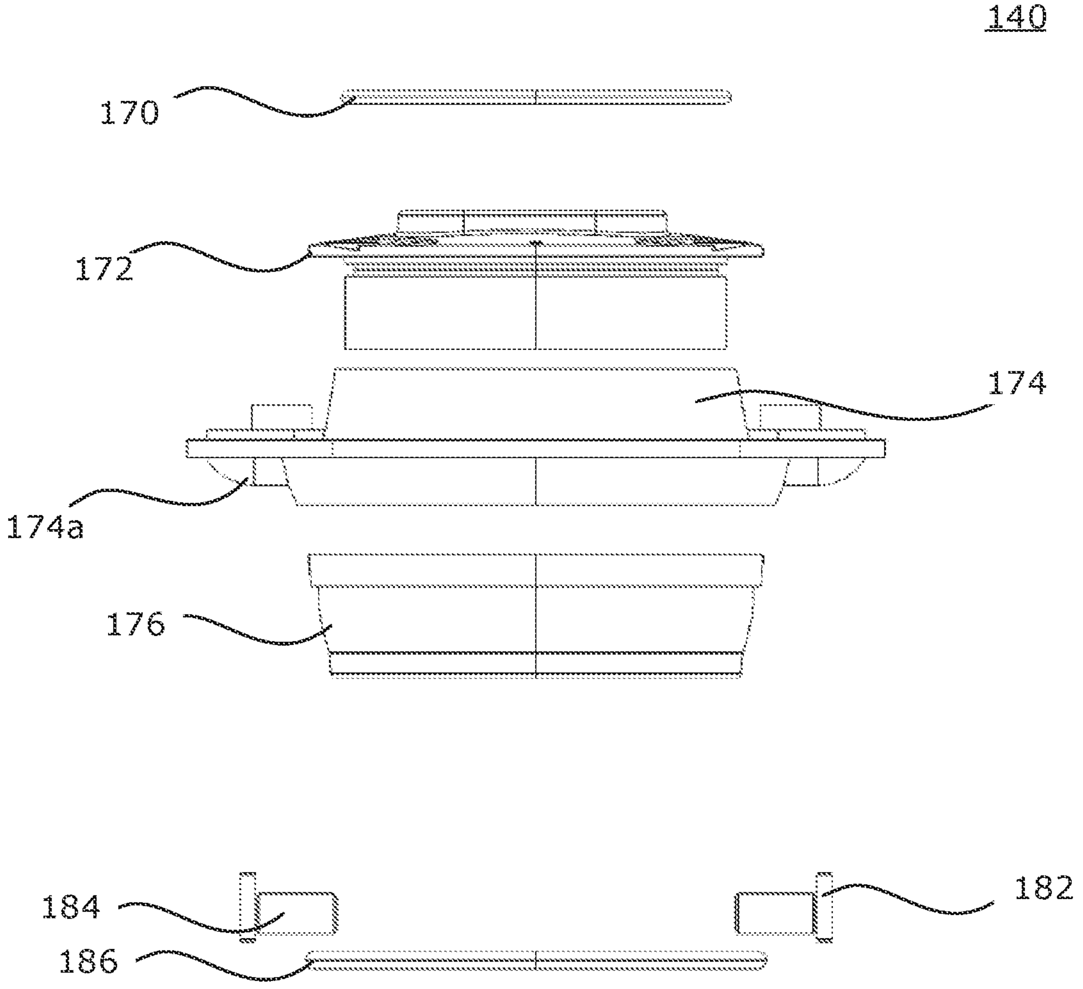
FIG. 11B is an exploded view of a substructure of the floating connector embodiment of FIG. 11A arranged to movably isolate at least a portion of the floating connector from a housing of an aerial control fixture.

The floating connector 138 of FIGS. 11A, 11B includes a two part clamping structure 160, a substrate 162, electronic circuitry 164, signal distribution means 166, 168, a first sealing means 170, a retention structure 172, a tilt housing 174 with one or more shaped wells 174$a$, a generally semi-spherical floating bushing 176, first and second retention means 178, 180, one or more pin stops 182, one or more pivot pins 184, a second sealing means 186, an electrical contact support structure 188, a third sealing means 190, and at least one set of electrical contacts 192. To avoid unnecessarily obscuring the inventive subject matter of FIGS. 11A, 12A, a single one of a plurality of structures in each figure may be identified, and others of the plurality of structures, particularly those that are evident by their shape, size, and positioning in the figure, are not individually identified. Components of FIGS. 11A, 12A, or different components, may be used to construct other floating connectors consistent with the teachings of the present disclosure. That is, the components, structures, devices, elements, and other means used to construct or otherwise form a floating connector 138 are not limited merely to those represented in FIGS. 11A, 12A or the other figures of the present disclosure. Instead, one of skill in the art will recognize that many of the shapes, sizes, configurations, and the like of the illustrated embodiments are selected to implement the inventive features of a floating connector taught in the present disclosure.

Turning to the floating connector embodiment of FIGS. 11A, 12A, a generally semi-spherical floating bushing 176 is a rotational element arranged to movably isolate at least a portion of the floating connector 138 from the housing of a controller (e.g., an aerial control fixture) that the floating connector 138 is integrated in. In this way, for example, when the controller is electromechanically coupled to a device having a roadway-area-lighting-standard-compliant female connector, the electromechanical junction is permitted to achieve a symmetrical relationship even if the larger bodies (e.g., an aerial lighting fixture such as a streetlight and an aerial control fixture) are not symmetrically oriented to each other. Stress is removed from the electromechanical junction by way of the permitted motion in the floating connector 138. This stress reduction is achieved during the act of electromechanically coupling the two devices, during the act of de-coupling the two devices, and while the two devices are electromechanically coupled to each other. The stress relief achieved while the two devices are electromechanically coupled to each other may be relief from a static stress caused, for example, by a center of gravity of one or both of the devices that is distant from the standardized powerline interface (e.g., one side of a device is heavier than another side). The stress relief achieved while the two devices are electromechanically coupled to each other may be relief from a dynamic stress caused, for example, by strong wind, snow or other precipitation, vandalism, use of one or both of the devices as a support platform for yet third device, or other reasons.

The generally semi-spherical floating bushing 176 is cooperatively mated with the tilt housing 174. In the embodiment of FIGS. 11A, 12A, two pivot pins 184 are positioned in respective apertures of the bushing 176 and seated in respective shaped wells of the tilt housing 174. With structures arranged in this way, the generally semi-spherical floating bushing 176 is arranged to rotate about an X-axis (FIGS. 8E, 9E). One of skill in the art will recognize, however, that many other implementations may be formed so as to achieve different rotational effects (e.g., rotation, pivot, tilt, and other motion) for a floating connector. For example, the size and shape of the shaped wells 174*a* may be formed to allow motion in different axes, the size or shape of the apertures in the tilt housing 174 may be formed to allow motion in different axes, a plurality of tilt housings 174 may be nested without any shaped wells or with a plurality of shaped wells to allow motion in different axes, the characteristics (e.g., size, shape) of the mating surfaces may be selected to allow motion in different axes, and still other arrangements may be formed. In all of these cases, the generally semi-spherical floating bushing 176 structure may be understood to pivot within the tilt housing 174 about at least one point. In others of these cases, the generally semi-spherical floating bushing 176 structure may be understood to pivot within the tilt housing 174 about at least two points, at least four points, or at least some other number of points.

The generally semi-spherical floating bushing 176 may be referred to as a tilt ball structure, a rotating bushing, a motion or rotational means, or some other like term. The tilt housing 174 and bushing 176 are in some cases formed with a carbon reinforced thermoplastic, however, other materials (e.g., a plastic, a composite, a metal, or any other suitable material) are contemplated. The tilt housing 174 and bushing 176 may be injection molded, machined, or formed using some other process. In at least some cases one or more surfaces of the tilt housing 174 and bushing 176 may include films, coatings, or other such materials to control the friction or absence of friction between the mating surfaces.

In at least some cases, pin stops structures 182 or other means are formed in a floating connector 138 to control the amount of permitted motion. For example, in some cases, if a height adjustment between a support arm 104 (FIG. 2) and a luminaire 106 (FIG. 2) is permitted at plus or minus five degrees (+/−5°), then pin stops structures 182, bosses, springs, tapers, or any other suitable stopping means may be implemented to limit the direction of motion, range of motion, or other characteristics of motion to plus or minus five degrees (+/−5°). Other ranges are of course contemplated. Pin stops 182 and pivot pins 184 may be formed of stainless steel, copper, bronze, and alloy, a composite material, a plastic, or any other suitable material.

The retention structure 172 in the floating connector of FIGS. 11A, 12A is coupled to the generally semi-spherical floating bushing 176 via a plurality of first retention means 178. The retention structure 172 may be sized, shaped, or sized and shaped to cooperate with the generally semi-spherical floating bushing 176 within the tilt housing 174 in at least some cases. The first retention means 178 in FIGS. 11A, 12A are a set of screws. In other cases, the first retention means may be glue, epoxy, or some other adhesive. In still other cases, the first retention means may include locking plastic or metal components, friction fit structures, or any other suitable means of retention.

An electrical support structure 188 is a rigid, shaped component arranged to host a first set of electrical contacts 192. As represented in FIGS. 11A, 12A, the first set of electrical contacts 192 are formed as the three male pins (i.e., blades) of a standardized powerline interface that protrude from the substantially planar surface of the electrical support structure 188. The first set of electrical contacts 192 is arranged about a first central axis that is substantially normal to the substantially planar surface of the electrical support structure 188. In some cases, the electrical support structure 188 may host a second set of electrical contacts, a third set of electrical contacts, or any suitable number of electrical contacts. These additional electrical contacts may be arranged as dimming pins, a high-speed data interface, or any other electrical contacts.

In some cases, the electrical support structure 188 is a disc-like structure sized to cooperate with the tilt housing 174, the generally semi-spherical floating bushing 176, or both the tilt housing 174 and bushing 176. In at least some cases, the second sealing means 186 is arranged as a highly polished silicone O-ring. In one embodiment, the outside surface of the second sealing means 186 is positioned in a channel formed in an inside surface of the tilt housing 174. In this configuration, the mating seal region for the second sealing means 186 is an outside surface of the floating bushing 176. Alternatively, in at least one other embodiment, the surface on the inside diameter of the second sealing means 186 is positioned in a channel of the electrical support structure 188, and the surface on the outside diameter of the second sealing means 186 is positioned in a channel of the generally semi-spherical floating bushing 176. These and other formation and positioning of the structures of interest mechanically couples the electrical contact support structure 188 to the bushing 176 and seals moving parts of the floating connector 138 from outside elements (e.g., dirt, moisture, and other outside substances).

Optionally, third sealing means 190 is positioned around the electrical contacts 192 on a plane or surface of the electrical contact support structure 188. In some cases, the third sealing means 190 is a foam gasket. Other materials, shapes, sizes, positions, and other such characteristics are contemplated. The third sealing means 190 may act as a cushioning means to flexibly separate portions of the floating connector 138 from a roadway-area-lighting-standard-compliant female connector.

Proximate the retention structure 172, a substrate 162, such as a circuit board, is arranged to host optional electronic circuitry 164. The electronic circuitry 164 may include fuses, switches, filters, timers, resistors, rectifiers, capacitors, or any other desirable circuitry. The substrate 162 in the floating connector 138 also includes one or more signal distribution means 166, 168. A first signal distribution means 166 is arranged as a powerline signals header that provides an electrical coupling for powerline signals (e.g., a common/neutral/ground signal, a power/line voltage signal, and a load signal). A second signal distribution means 168 is arranged as a dimmer signals header for dimming signals as might be used in conventional streetlight technologies. Optionally, other signal distribution means 166, 168 may pass digital addressable lighting interface (DALI) signals, proprietary communications signals, high-speed data signals, or any other suitable signals. The signal distribution means 166, 168 may include screw terminals, lugs, knife blade contacts, spring-loaded contacts, or any other suitable means to distribute electrical signals.

A first sealing means 170 is positioned in a channel on the retention structure 172, which is subsequently nested within the generally semi-spherical floating bushing 176. In this case, the first sealing means 170 is compressed to form a seal on an inside diameter of the of the generally semi-spherical floating bushing 176. The first retention means 178 is/are arranged to facilitate such sealing by compressing the first sealing means 170 between the retention structure 172 and the generally semi-spherical floating bushing 176.

In at least one other embodiment, the first sealing means 170 is positioned between the substrate 162 and the retention structure 172. The first sealing means 170 which in at least some cases is formed as an O-ring from a highly polished silicone material, is compressed in place by one or more clamping structures 160 mechanically secured via the second retention means 180 coupled to the tilt housing 174. The clamping structures 160 may be shaped structures, and the second retention means 180 may be screws, any suitable adhesive, single-use locking structures, or some other securing means.

Figure 12B:
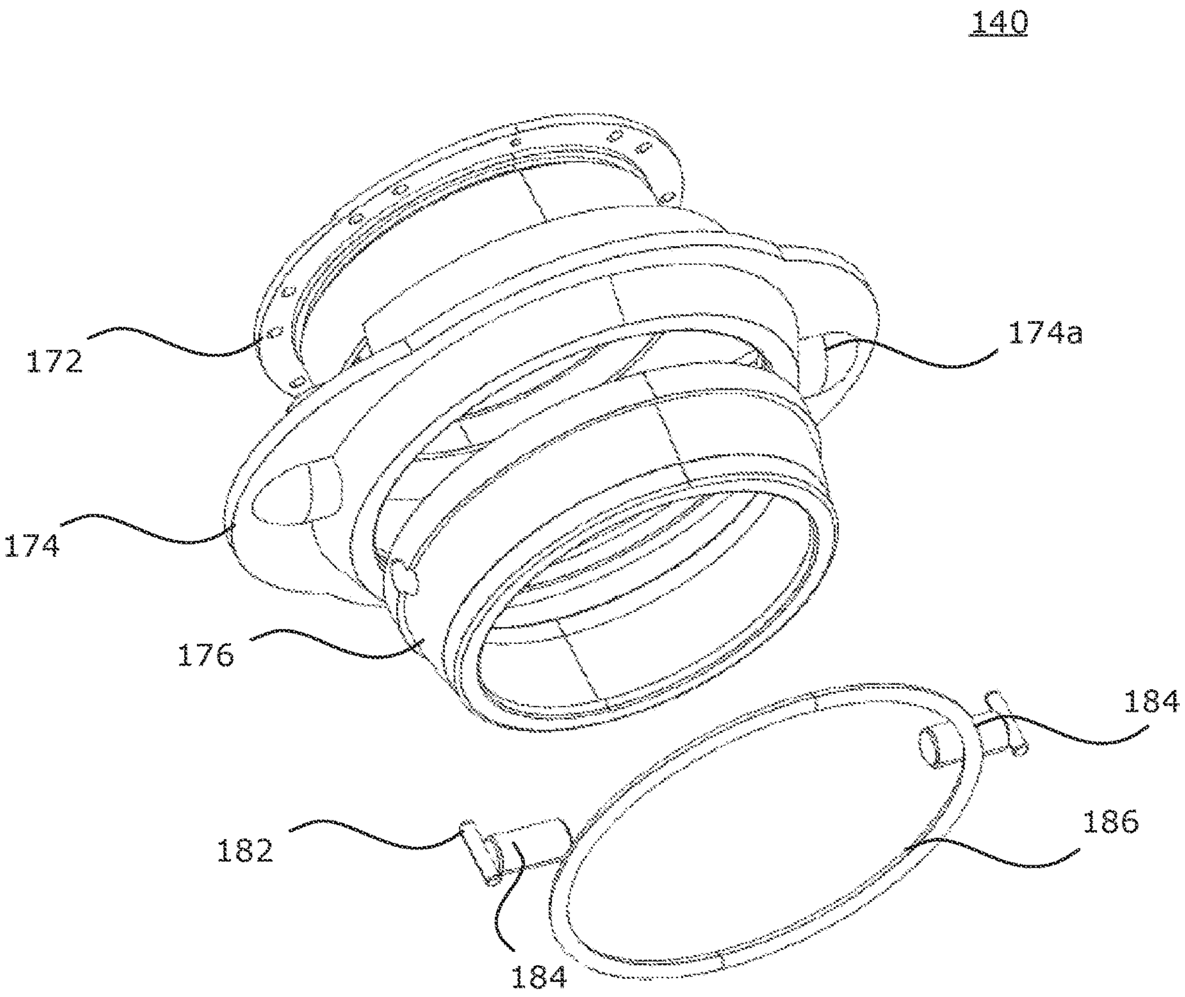
FIG. 12B is an exploded view of a substructure of the floating connector embodiment of FIG. 12A arranged to movably isolate at least a portion of the floating connector from a housing of an aerial control fixture.

FIG. 11B is an exploded view of a substructure 140 of the floating connector 138 embodiment of FIG. 11A arranged to movably isolate at least a portion of the floating connector 138 from a housing of an aerial control fixture. FIG. 12B is an exploded view of a substructure 140 of the floating connector embodiment of FIG. 12A arranged to movably isolate at least a portion of the floating connector from a housing of an aerial control fixture. The substructure 140 is integrated with the floating connector 138 and arranged to provide the first substantially planar surface of the electrical contact support structure 188 with a range of motion relative to the tilt housing 174. As evident in FIGS. 11B, 12B, the substructure 140 includes a set of structures not found in any conventional standards-based connector 108*a*, 108*b* (FIGS. 5A, 5B, 6A, 6B). As further evident in FIGS. 11, 12, even though the illustrated floating connector 138 is directed toward a floating male connector, one of skill in the art will recognize that the teaching of the present disclosure may also be applied to a floating female connector.

Along these lines, the inventors have further recognized that one or structures of the floating connector 138 may be integrally (e.g., rigidly, permanently, or the like) formed as part of the aerial control fixture, the luminaire, or any other structure where the teaching of a floating connector are deployed. The tilt housing 174, for example, may in some cases be integrated with the greater housing of the aerial control fixture 110*b* or the greater housing structure of a luminaire 106. Additionally, or alternatively, clamping structures 160, the retention structure 172, the electrical support structure 188, or some other portion or portions of a floating connector may be integrated with one or more devices that deploy such a motion-enable floating connector.

Figure 13A:
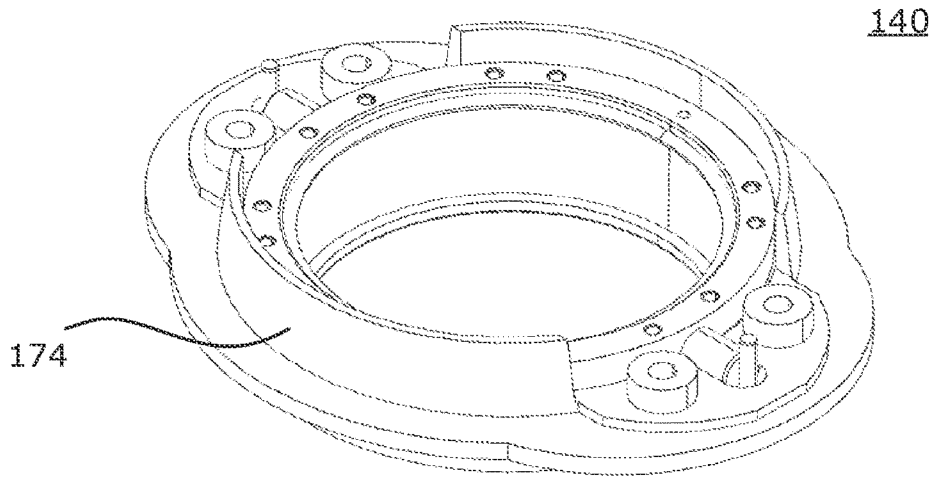
FIG. 13A is a substructure embodiment of a floating connector.
Figure 13B:
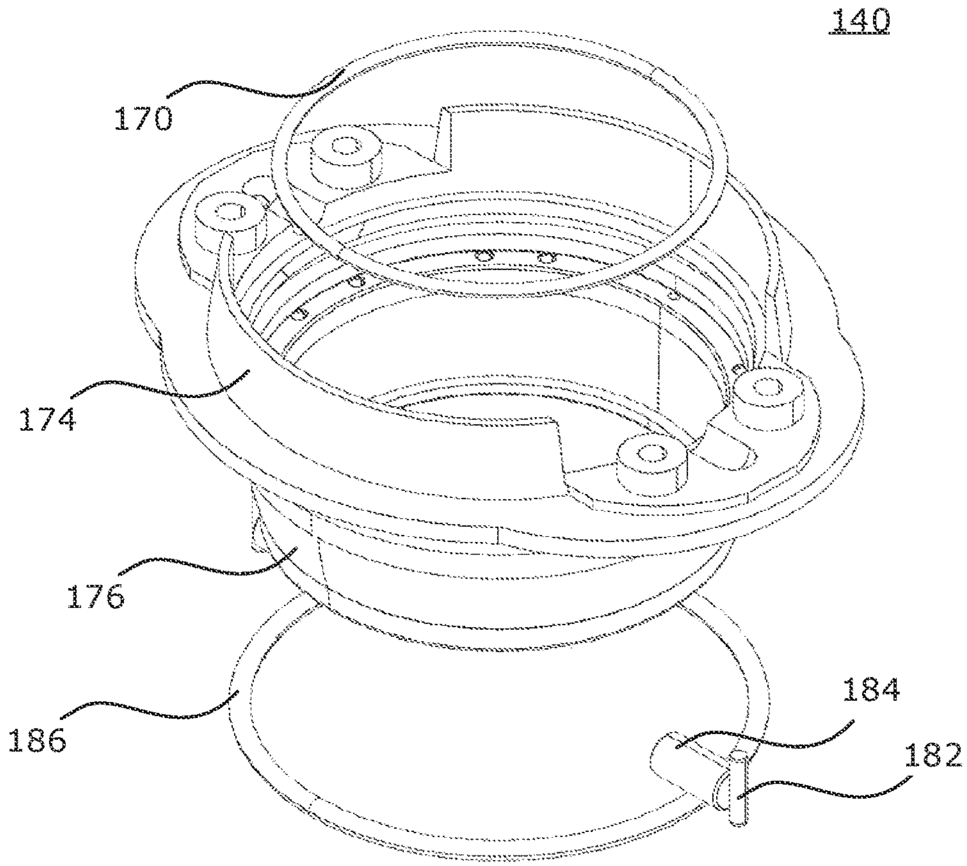
FIG. 13B is an exploded view of the substructure embodiment of FIG. 13A.

FIG. 13A is a substructure 140 embodiment of a floating connector 138. FIG. 13B is an exploded view of the substructure 140 embodiment of FIG. 13A. The figures are provided to assist one of skill in the art to gain a still better understanding of the floating connector teaching of the present disclosure.

Figure 14A:
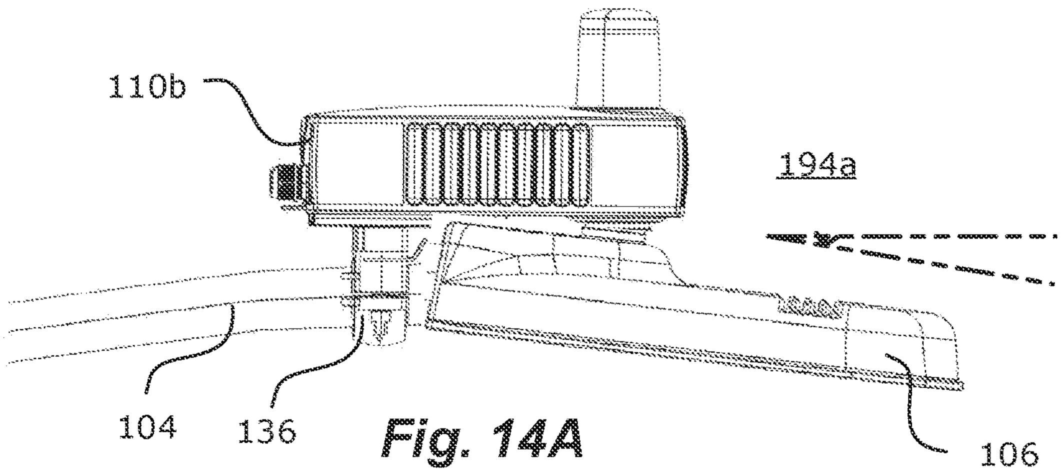
FIGS. 14A-14C are various embodiments of an aerial control fixture having a floating connector coupled to an aerial lighting fixture.
Figure 14B:
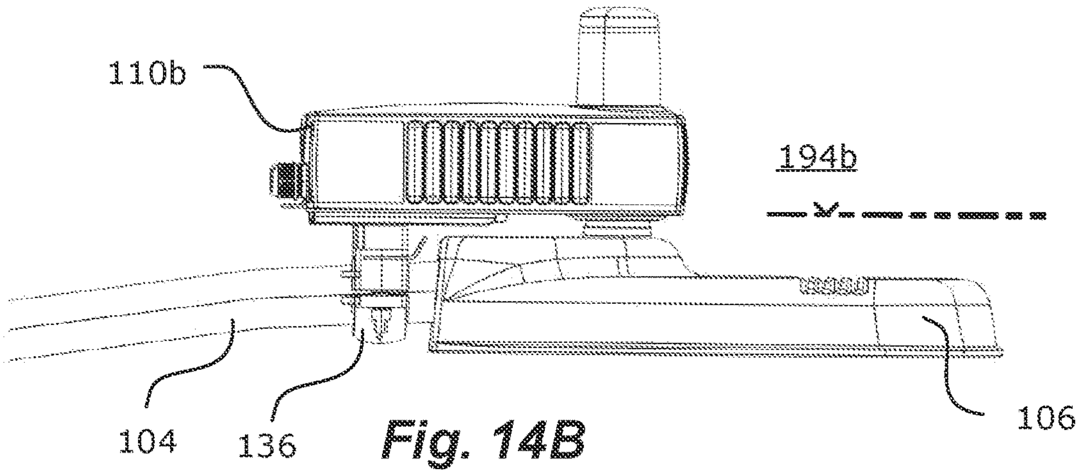
Figure 14C:
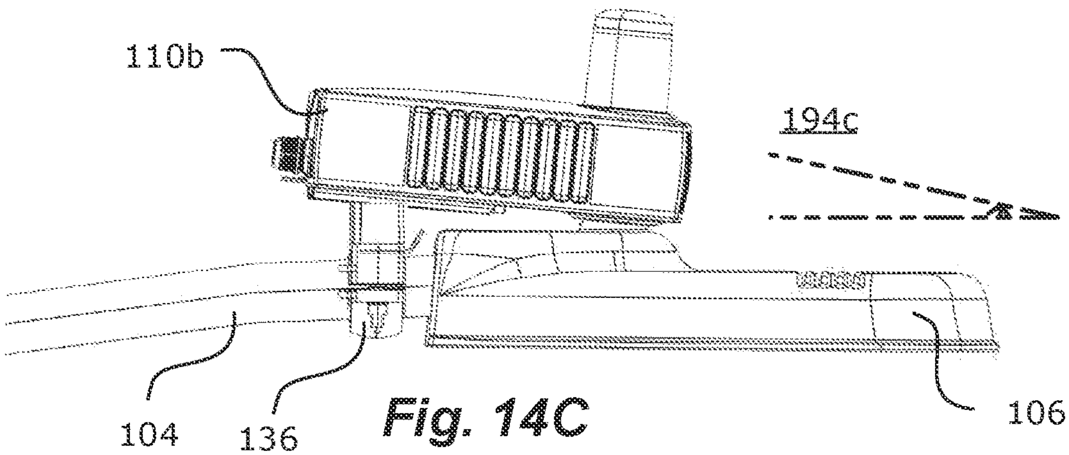
Figure 15C:
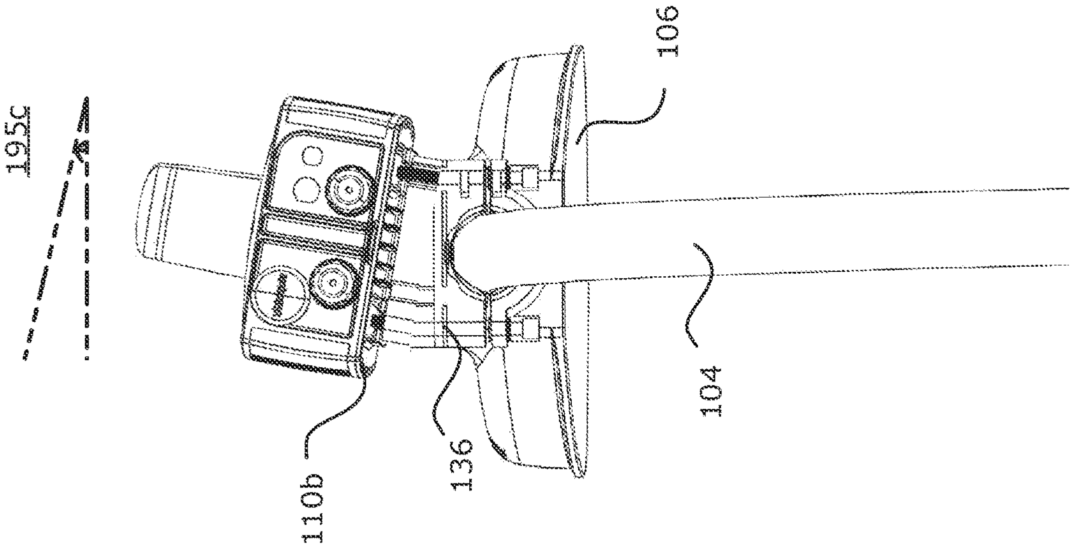
FIGS. 15A-15C are various embodiments of an aerial control fixture having a floating connector coupled to an aerial lighting fixture.
Figure 15B:
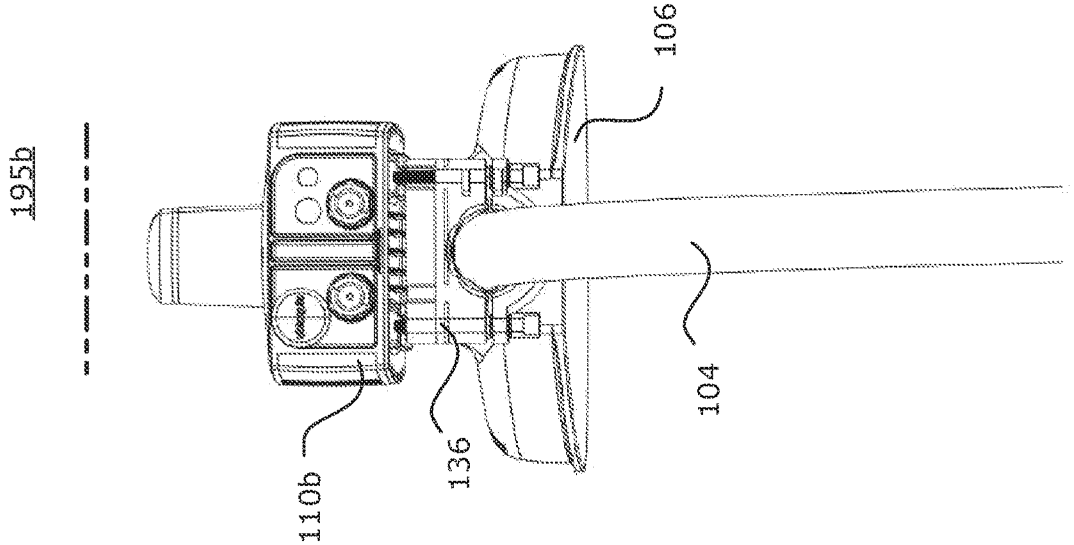
Figure 15A:
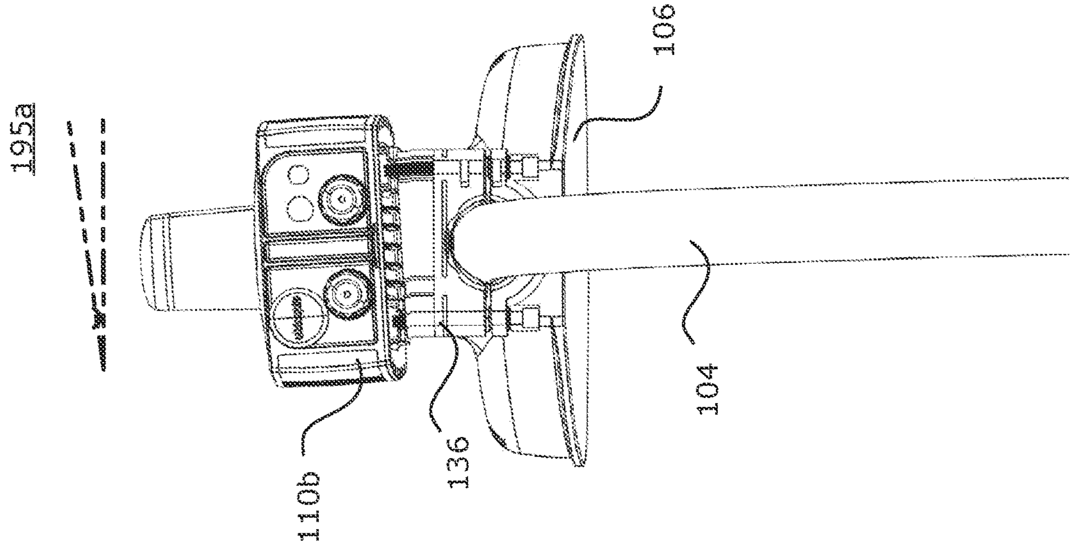

FIGS. 14A-14C are various embodiments of an aerial control fixture 110*b* having a floating connector coupled to an aerial lighting fixture 106. FIGS. 15A-15C are various other embodiments of an aerial control fixture 110*b* having a floating connector coupled to an aerial lighting fixture 106. In FIGS. 14, 15, the aerial control fixture 110*b* is further coupled to a support arm 104 via a clamp 136.

In FIG. 14, various non-symmetries between the aerial control fixture 110*b* and the aerial lighting fixture 106 are evident. For example, in FIG. 14A, the aerial control fixture 110*b* is mounted on the aerial lighting fixture 106 and support arm 104 with a first non-symmetrical orientation about the X-axis 194*a* of about minus seven degrees (−7°); while in FIG. 14B, the aerial control fixture 110*b* is mounted on the aerial lighting fixture 106 and support arm 104 with a second symmetrical orientation about the X-axis 194*b*; and in FIG. 14C, the aerial control fixture 110*b* is mounted on the aerial lighting fixture 106 and support arm 104 with a third non-symmetrical orientation about the X-axis 194*c* of about plus eleven degrees (11°).

In FIG. 15, various non-symmetries between the aerial control fixture 110*b* and the aerial lighting fixture 106 are evident. For example, in FIG. 14A, the aerial control fixture 110*b* is mounted on the aerial lighting fixture 106 and support arm 104 with a first non-symmetrical orientation about the Y-axis 195*a* of about plus eleven degrees (11°); while in FIG. 15B, the aerial control fixture 110*b* is mounted on the aerial lighting fixture 106 and support arm 104 with a second symmetrical orientation about the Y-axis 195*b*; and in FIG. 15C, the aerial control fixture 110*b* is mounted on the aerial lighting fixture 106 and support arm 104 with a third non-symmetrical orientation about the Y-axis 195*c* of about minus twelve degrees (−12°).

To provide a clearer illustration of symmetrical and non-symmetrical orientations in FIG. 14, any symmetries and non-symmetries about the Y-axis and Z-axis are not represented. Along these lines, any symmetries and non-symmetries about the X-axis and Z-axis are also left out of FIG. 15. Nevertheless, one of skill in the art will recognize that placement of an aerial control fixture 110*b* on an aerial lighting fixture 106 may be affected by the orientation of the aerial lighting fixture 106 relative to the support arm 104, the orientation of the female powerline connector integrated with the aerial lighting fixture 106, and many other factors. Accordingly, non-symmetries may exist in any direction. These non-symmetries may place an unacceptable stress on the powerline connector system, which may lead to a system failure. Conversely, when the floating connectors illustrated and described in the present disclosure are deployed, the effects of such non-symmetries may be reduced or even completely mitigated.

Having now set forth certain embodiments, further clarification of certain terms used herein may be helpful to providing a more complete understanding of that which is considered inventive in the present disclosure.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a utility pole may be described as being formed or otherwise oriented "substantially vertical," In these cases, a device that is oriented exactly vertical is oriented along a "Z" axis that is normal (i.e., 90 degrees or at right angle) to a plane formed by an "X" axis and a "Y" axis. Different from the exact precision of the term, "vertical," the use of "substantially" to modify the characteristic permits a variance of the "vertical" characteristic by up to 30 percent. Accordingly, a utility pole that is oriented "substantially vertical" includes utility poles oriented between 63 degrees and 117 degrees. A utility pole that is oriented at 45 degrees of an X-Y plane, however, is not mounted "substantially vertical." As another example, a floating connector having a particular linear dimension of "between about three (3) inches and five (5) inches" includes such devices in which the linear dimension varies by up to 30 percent, Accordingly, the particular linear dimension of the floating connector may be between one point five (1.5) inches and six point five (6.5) inches. Along these lines, a floating connector that is arranged for substantially permanent placement (e.g., coupling, electromechanical connection, or the like) may be understood as a connector arranged for placement in a desired location and not planned for removal at a certain or indeterminate time, which may be weeks, months, years, or some other period of time after placement. A device that is arranged for substantially permanent placement may be distinguished from a first device that is arranged for permanent placement and from a second device that is arranged for short-term placement. The first device that is arranged for permanent placement generally includes devices that would create damage upon removal to one or both of the first device and the structure the first device is placed in. The second device that is arranged for short-term placement generally includes devices that are planned for predictable, frequent removal, replacement, or removal and replacement after a short time, which may be seconds, minutes, hours, or days. To add some clarity, second devices arranged for short-term placement may include devices coupled with USB connectors, devices with Type B plugs or sockets, which are generally known in the United States to provide a 110 VAC consumer-level power interface, devices having a low power direct current power supply interface, and the like.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the term "floating connector" means a connector or portion thereof that is designed having one or more movable structures arranged to accommodate a misalignment of a mating connector. Floating connectors include connectors that enable movement of a first structure relative to a second structure in at least one direction or about at least one axis.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The floating connectors and their associated, integrated, and peripheral structures described in the present disclosure provide several technical effects and advances to the field of electrical, mechanical, and electromechanical connection devices.

Technical effects and benefits include the ability to improve the reliability and safety of the power grid by facilitating the connection of larger and more functional control devices to streetlights. For example, in at least one embodiment, a small cell is electromechanically coupled to a streetlight that has a roadway-area-standard-compliant female connector and concurrently coupled to another portion of the streetlight structure such as the support arm. This secondary coupling reduces stress on the female connector and reduces the likelihood that certain environmental conditions, such as high winds, because a structural failure of the controller, the streetlight, or both. In systems where the secondary coupling is deployed, it is frequently the case that the point of secondary coupling does not permit the controller to be positioned in-plane with the roadway-area-standard-compliant female connector. To address this out-of-plane condition, a floating connector may be integrated with controller in such a way as to isolate the floating connector from the housing of the controller.

The present disclosure sets forth details of various structural embodiments that may be arranged to carry the teaching of the present disclosure. By taking advantage of the flexible circuitry, mechanical structures, and other means described herein, a number of exemplary methods, devices, and systems are now disclosed.

Example A-1 is a system to couple a controller to a roadway-area-lighting-standard-compliant female connector that is integrated in a roadside aerial lighting fixture, comprising: a floating male connector integrated with a housing of the controller, wherein the floating male connector is arranged for substantially permanent coupling to the roadway-area-lighting-standard-compliant female connector, the floating male connector including: a substantially planar surface; a first set of electrical contacts protruding from the substantially planar surface, wherein the first set of electrical contacts is arranged about a first central axis that is substantially normal to the substantially planar surface; and a substructure integrated with the floating male connector, the substructure arranged to movably isolate at least a portion of the floating male connector from the housing of the controller during an act of electromechanically coupling the first set of electrical contacts of the floating male connector to a second set of electrical contacts recessed in the roadway-area-lighting-standard-compliant female connector.

Example A-2 may include the subject matter of Example A-1, and alternatively or additionally any other example herein, wherein the roadway-area-lighting-standard-compliant female connector is compliant with American National Standards Institute (ANSI) C136.

Example A-3 may include the subject matter of Example A-2, and alternatively or additionally any other example herein, wherein the roadway-area-lighting-standard-compliant female connector is compliant with ANSI C136.41-2013.

Example A-4 may include the subject matter of any of Examples A-1 to A-3, and alternatively or additionally any other example herein, wherein the substructure integrated with the floating male connector further comprises: a tilt housing; and a tilt ball structure arranged within the tilt housing, wherein the tilt ball structure is arranged to pivot within the tilt housing about at least one point.

Example A-5 may include the subject matter of any of Examples A-1 to A-4 and alternatively or additionally any other example herein, wherein the tilt ball structure is arranged to pivot within the tilt housing about at least two points.

Example A-6 may include the subject matter of any of Examples A-1 to A-5, and alternatively or additionally any other example herein, wherein the tilt ball structure is arranged to pivot within the tilt housing about at least four points.

Example A-7 may include the subject matter of any of Examples A-1 to A-6, and alternatively or additionally any other example herein, wherein the substructure integrated with the floating male connector further comprises: a tilt housing; a tilt ball structure arranged within the tilt housing, wherein the tilt ball structure is arranged to pivot within the tilt housing about at least two points; at least two pivot pins that enable the pivoting within the tilt housing about the at least two points; a first retaining structure arranged to retain the tilt ball structure within the tilt housing; and an O-ring arranged to flexibly seal internal structures of the floating male connector from, for example, foreign substances, moisture, insects, and the like.

Example A-8 may include the subject matter of any of Examples A-1 to A-7, and alternatively or additionally any other example herein, wherein the controller includes a smart streetlight controller.

Example A-9 may include the subject matter of any of Examples A-1 to A-8, and alternatively or additionally any other example herein, wherein the controller includes a small cell.

Example A-10 may include the subject matter of any of Examples A-1 to A-9, and alternatively or additionally any other example herein, wherein the controller includes wireless access point circuitry.

Example A-11 may include the subject matter of any of Examples A-1 to A-10, and alternatively or additionally any other example herein, wherein the substructure permits the housing of the controller to be at least five degrees (5°) out of parallel with the substantially planar surface.

Example A-12 may include the subject matter of any of Examples A-1 to A-11, and alternatively or additionally any other example herein, wherein the floating male connector has a diameter of between about two inches (2") and about four inches (4").

Example A-13 may include the subject matter of any of Examples A-1 to A-12, and alternatively or additionally any other example herein, wherein the floating male connector has a diameter of about three inches (3").

Example A-14 may include the subject matter of any of Examples A-1 to A-13, and alternatively or additionally any other example herein, wherein the floating male connector has a diameter of more than two inches (2").

Example A-15 may include the subject matter of any of Examples A-1 to A-14, and alternatively or additionally any other example herein, wherein the floating male connector has a diameter of less than six inches (6").

Example A-16 may include the subject matter of any of Examples A-1 to A-15, and alternatively or additionally any other example herein, wherein the floating male connector has a height of between about one-half inch (0.5") and about four inches (4").

Example A-17 may include the subject matter of any of Examples A-1 to A-16, and alternatively or additionally any other example herein, wherein the floating male connector has a height of about one and one-quarter inches (1.25").

Example A-18 may include the subject matter of any of Examples A-1 to A-17, and alternatively or additionally any other example herein, wherein the floating male connector has a height of more than one inches (2").

Example A-19 may include the subject matter of any of Examples A-1 to A-18, and alternatively or additionally any other example herein, wherein the floating male connector has a height of less than six inches (6").

Example A-20 may include the subject matter of any of Examples A-1 to A-19, and alternatively or additionally any other example herein, wherein the floating male connector has generally cylindrical shape.

Example A-21 may include the subject matter of any of Examples A-1 to A-19, and alternatively or additionally any other example herein, wherein the floating male connector has generally circular cross-sectional shape.

Example A-22 may include the subject matter of any of Examples A-1 to A-19, and alternatively or additionally any other example herein, wherein the floating male connector has generally cubic shape.

Example A-22 may include the subject matter of any of Examples A-1 to A-19, and alternatively or additionally any other example herein, wherein the floating male connector has generally square cross-sectional shape.

Example A-23 may include the subject matter of any of Examples A-1 to A-19, and alternatively or additionally any other example herein, wherein the floating male connector has generally hexagonal cross-sectional shape.

Example A-24 may include the subject matter of any of Examples A-1 to A-23, and alternatively or additionally any other example herein, wherein at least one surface of the floating male connector is coated with a non-conductive lubricant to facilitate motion of a tilt ball structure within the tilt housing.

Example A-25 may include the subject matter of any of Examples A-1 to A-24 and alternatively or additionally any other example herein, wherein at least one surface of the floating male connector is coated with a non-conductive sealant to restrict ingress of foreign bodies into the floating male connector.

Example A-26 may include the subject matter of any of Examples A-1 to A-25 and alternatively or additionally any other example herein, wherein a diameter of the floating connector is between about one inch (1 in.) and about eight inches (8 in.).

Example A-27 may include the subject matter of any of Examples A-1 to A-26 and alternatively or additionally any other example herein, wherein a diameter of the floating connector is between about two inches (2 in.) and about four inches (4 in.).

Example A-28 may include the subject matter of any of Examples A-1 to A-27 and alternatively or additionally any other example herein, wherein a diameter of the floating connector is about three inches (3 in.).

Example A-29 may include the subject matter of any of Examples A-1 to A-28 and alternatively or additionally any other example herein, wherein a diameter of the substantially planar surface is between about two inches (2 in.) and about four inches (4 in.).

Example A-30 may include the subject matter of any of Examples A-1 to A-29 and alternatively or additionally any other example herein, wherein a diameter of the substantially planar surface is about three inches (3 in.).

Example A-31 may include the subject matter of any of Examples A-1 to A-30 and alternatively or additionally any other example herein, wherein an area of the substantially planar surface is between about three square inches (3 $in^2$.) about twenty-five square inches (25 $in^2$.).

Example A-32 may include the subject matter of any of Examples A-1 to A-31 and alternatively or additionally any other example herein, wherein an area of the substantially planar surface is between about six square inches (6 $in^2$.) about twelve square inches (12 $in^2$.).

Example A-33 may include the subject matter of any of Examples A-1 to A-32 and alternatively or additionally any other example herein, wherein an area of the substantially planar surface is about nine and one-half inches (9.5 $in^2$.).

Example A-34 may include the subject matter of any of Examples A-1 to A-33 and alternatively or additionally any other example herein, wherein a thickness of the floating connector is between about one inch (1 in.) and about four inches (4 in.).

Example A-35 may include the subject matter of any of Examples A-1 to A-34 and alternatively or additionally any other example herein, wherein a thickness of the floating connector is between about one inch (1 in.) and about one and one-half inches (1.5 in.).

Example A-36 may include the subject matter of any of Examples A-1 to A-35 and alternatively or additionally any other example herein, wherein a thickness of the floating connector is about one and one-quarter inches (1.25 in.).

Example B-1 is a floating connector, comprising: at least one housing structure; a first substantially planar surface positioned within the at least one housing structure; a first set of electrical contacts protruding from the first substantially planar surface and arranged about a first central axis, the first central axis being substantially normal to the first substantially planar surface, wherein the first set of electrical contacts is arranged for substantially permanent coupling to a second set of electrical contacts of a female connector that is compliant with a roadway area lighting standard promoted by a standards body, the second set of electrical contacts recessed into a second substantially planar surface of the female connector and the second set of electrical contacts arranged about a second central axis, the second central axis being substantially normal to the second substantially planar surface; and a substructure integrated with the floating connector, the substructure arranged to provide the first substantially planar surface with a range of motion relative to the at least one housing structure.

Example B-2 may include the subject matter of Example B-1, and alternatively or additionally any other example herein, wherein the range of motion relative to the at least one housing structure is about zero to five degrees (5°) in at least one direction.

Example B-3 may include the subject matter of any of Examples B-1 to B-2, and alternatively or additionally any other example herein, wherein the range of motion relative to the at least one housing structure is at least five degrees (5°) in at least two directions.

Example B-4 may include the subject matter of any of Examples B-1 to B-3, and alternatively or additionally any other example herein, wherein the floating connector further comprises a tilt ball structure arranged within the at least one housing structure, wherein the tilt ball structure is arranged to move within the at least one housing structure about at least two points; at least two pivot pins that enable the motion of the tilt ball structure within the at least one housing structure about the at least two points; a first retaining structure arranged to retain the tilt ball structure within the at least one housing structure; and an O-ring arranged to flexibly seal internal structures of the floating connector.

Example B-5 may include the subject matter of any of Examples B-1 to B-4 and alternatively or additionally any other example herein, wherein the floating connector further comprises power circuitry electrically coupled to the first set of electrical contacts.

Example C-1 is a method, comprising: positioning a controller proximate a roadside aerial lighting fixture, wherein a primary male connector is integrated with a housing of the controller, wherein a primary female connector is integrated with the roadside aerial lighting fixture, and wherein the primary female connector is compliant with a roadway area lighting standard promoted by a standards body; rotatably coupling a first set of electrical contacts that protrude from a first substantially planar surface integrated with the primary male connector into a second set of electrical contacts that are recessed into a second substantially planar surface integrated with the primary female connector, wherein the first set of electrical contacts is arranged about a first central axis, the first central axis being substantially normal to the first substantially planar surface, and wherein the second set of electrical contacts is arranged about a second central axis, the second central axis being substantially normal to the second substantially planar surface; during the rotatable coupling, permitting the controller to float about the first substantially planar surface in an orientation that is not parallel to the first substantially planar surface; and during the rotatable coupling, mechanically limiting the float of the controller in at least one direction.

Example C-2 may include the subject matter of Example C-1, and alternatively or additionally any other example herein, wherein the method further comprises sealing internal structures of the primary male connector via an O-ring.

Example C-3 may include the subject matter of any of Examples C-1 to C-2, and alternatively or additionally any other example herein, wherein the method further comprises providing power to the controller via the first and second sets of electrical contacts.

Example C-4 may include the subject matter of any of Examples C-1 to C-3, and alternatively or additionally any other example herein, wherein the primary female connector is compliant with ANSI C136.41-2013.

Example C-5 may include the subject matter of any of Examples C-1 to C-4, and alternatively or additionally any other example herein, wherein Example D-1 is system to couple a controller to a roadside aerial lighting fixture, comprising: a primary male connector integrated with a housing of the controller; a primary female connector integrated with the roadside aerial lighting fixture, wherein the primary male connector is arranged for substantially permanent coupling to the primary female connector, wherein the primary female connector is compliant with a roadway area lighting standard promoted by a standards body; a first substantially planar surface integrated with the primary male connector and having a first set of electrical contacts protruding therefrom, wherein the first set of electrical contacts is arranged about a first central axis, the first central axis being substantially normal to the first substantially planar surface; a second substantially planar surface integrated with the primary female connector and having a second set of electrical contacts recessed therein, wherein the second set of electrical contacts is arranged about a second central axis, the second central axis being substantially normal to the second substantially planar surface; and a substructure integrated with the primary male connector, the substructure arranged to movably isolate at least a portion of primary male connector from the housing of the controller during an act of coupling the primary male connector to the primary female connector.

Example E-1 is a system to couple a controller to a roadside aerial lighting fixture, comprising: a floating connector integrated with a housing of the controller, wherein the floating connector is arranged for substantially permanent coupling to a roadway-area-lighting-standard-compliant connector, the floating connector including: a substantially planar surface; a first set of electrical contacts permanently affixed in the substantially planar surface, wherein the first set of electrical contacts is arranged about a first central axis that is substantially normal to the substantially planar surface; and a substructure integrated with the floating connector, the substructure arranged to movably isolate at least a portion of the floating connector from the housing of the controller during an act of electromechanically coupling the first set of electrical contacts of the floating connector to a second set of electrical contacts permanently affixed in the roadway-area-lighting-standard-compliant connector.

Example E-2 may include the subject matter of Example E-1, and alternatively or additionally any other example herein, wherein the roadway-area-lighting-standard-compliant female connector is compliant with American National Standards Institute (ANSI) C136.

Example E-3 may include the subject matter of Example E-2, and alternatively or additionally any other example herein, wherein the roadway-area-lighting-standard-compliant female connector is compliant with ANSI C136.41-2013.

Example E-4 may include the subject matter of any of Examples E-1 to E-3, and alternatively or additionally any other example herein, wherein the first set of electrical contacts of the floating connector protrude from the substantially planar surface of the floating connector.

Example E-5 may include the subject matter of any of Examples E-1 to E-4, and alternatively or additionally any other example herein, wherein the first set of electrical contacts of the floating connector are recessed through or within the substantially planar surface of the floating connector.

Example E-6 may include the subject matter of any of Examples E-1 to E-5, and alternatively or additionally any other example herein, wherein the second set of electrical contacts of the roadway-area-lighting-standard-compliant connector protrude from the roadway-area-lighting-standard-compliant connector.

Example E-7 may include the subject matter of any of Examples E-1 to E-6, and alternatively or additionally any other example herein, wherein the second set of electrical contacts of the floating connector are recessed through or within the roadway-area-lighting-standard-compliant connector.

Example F-1 is a floating connector, comprising: at least one housing structure; a first substantially planar surface positioned within the at least one housing structure; a first set of electrical contacts permanently affixed through or in the first substantially planar surface and arranged about a first central axis, the first central axis being substantially normal to the first substantially planar surface, wherein the first set of electrical contacts is arranged for substantially permanent coupling to a second set of electrical contacts of a connector that is compliant with a roadway area lighting standard promoted by a standards body, the second set of electrical contacts permanently affixed through or in a second substantially planar surface of the connector that is compliant with the roadway area lighting standard promoted by the standards body and the second set of electrical contacts arranged about a second central axis, the second central axis being substantially normal to the second substantially planar surface; and a substructure integrated with the floating connector, the substructure arranged to provide the first substantially planar surface with a range of motion relative to the at least one housing structure.

Example F-2 may include the subject matter of Example F-1, and alternatively or additionally any other example herein, wherein the connector that is compliant with the roadway area lighting standard promoted by the standards body is compliant with American National Standards Institute (ANSI) C136.

Example F-3 may include the subject matter of Example F-2, and alternatively or additionally any other example herein, wherein the connector that is compliant with the roadway area lighting standard promoted by the standards body is compliant with ANSI C136.41-2013.

Example F-4 may include the subject matter of any of Examples F-1 to F-3, and alternatively or additionally any other example herein, wherein the floating connector is compliant with American National Standards Institute (ANSI) C136.

Example F-5 may include the subject matter of any of Examples F-1 to F-4, and alternatively or additionally any other example herein, wherein the floating connector is compliant with ANSI C136.41-2013.

The various embodiments described above can be combined to provide further embodiments. Various features of the embodiments are optional, and features of one embodiment may be suitably combined with other embodiments. Aspects of the embodiments can be modified, if necessary to employ concepts of the various patents, application and publications to provide yet further embodiments.

U.S. Provisional Patent No. 62/614,914, filed Jan. 8, 2018, is incorporated herein by reference, in its entirety.

International Patent Application No. PCT/US2019/012775 filed Jan. 8, 2019, is incorporated herein by reference, in its entirety.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

What is claimed is:

1. A floating connector comprising:

a housing;

a substantially planar surface positioned within the housing;

a set of electrical contacts arranged substantially normal to the substantially planar surface;

a bushing cooperatively mated with the housing and the substantially planar surface so as to permit the bushing to pivot the substantially planar surface about one or more points, wherein the bushing defines a first pin aperture and a diametrically opposite second pin aperture;

a first pivot pin passed through the first pin aperture and pivotally interconnecting the bushing and the housing; and a second pivot pin passed through the second pin aperture and pivotally interconnecting the bushing and the housing.

2. The floating connector of claim 1, wherein the bushing has a generally semi-spherical shape.

3. The floating connector of claim 1, wherein the housing defines a pair of diametrically opposite wells, wherein a first well of the pair of wells receives a portion of the first pivot pin, and wherein a second well of the pair of wells receives a portion of the second pivot pin.

4. The floating connector of claim 1, further comprising:

a first pin stop structure connected to the first pivot pin; and a second pin stop structure connected to the second pivot pin;

wherein the first pin stop structure and the second pin stop structure limit a range of motion of the substantially planar surface about the one or more points.

5. The floating connector of claim 4, wherein the first pin stop structure and the second pin stop structure limit the range of motion of the substantially planar surface from about zero to about five degrees (5°) in at least one direction.

6. The floating connector of claim 1, wherein the bushing provides a range of motion of the substantially planar surface from about zero to about five degrees (5°) in at least one direction.

7. The floating connector of claim 1, wherein the bushing provides a range of motion of the substantially planar surface of at least five degrees (5°) in at least two directions.

8. The floating connector of claim 1, further comprising:

a retention structure arranged to retain the bushing within the housing.

9. An electronic apparatus mountable to a luminaire of a streetlight, the luminaire including a powerline interface, the electronic apparatus comprising:

a floating connector that includes:

a housing;

a substantially planar surface positioned within the housing;

a set of electrical contacts arranged substantially normal to the substantially planar surface, the set of electrical contacts configured to receive alternating current power from the powerline interface after the set of electrical contacts is mated to the powerline interface;

a bushing cooperatively mated with the housing and the substantially planar surface so as to permit the bushing to pivot the substantially planar surface about one or more points, wherein the bushing defines a first pin aperture and a diametrically opposite second pin aperture;

a first pivot pin passed through the first pin aperture and pivotally interconnecting the bushing and the housing; and a second pivot pin passed through the second pin aperture and pivotally interconnecting the bushing and the housing; and electronic circuitry electrically coupled to the set of electrical contacts.

10. The electronic apparatus of claim 9, wherein the bushing has a generally semi-spherical shape.

11. The electronic apparatus of claim 9, wherein the housing defines a pair of diametrically opposite wells, wherein a first well of the pair of wells receives a portion of the first pivot pin, and wherein a second well of the pair of wells receives a portion of the second pivot pin.

12. The electronic apparatus of claim 9, wherein the floating connector further includes:

a first pin stop structure connected to the first pivot pin; and a second pin stop structure connected to the second pivot pin;

wherein the first pin stop structure and the second pin stop structure limit a range of motion of the substantially planar surface about the one or more points.

13. The electronic apparatus of claim 12, wherein the first pin stop structure and the second pin stop structure limit the range of motion of the substantially planar surface from about zero to about five degrees (5°) in at least one direction.

14. The electronic apparatus of claim 9, wherein the bushing provides a range of motion of the substantially planar surface from about zero to about five degrees (5°) in at least one direction.

15. The electronic apparatus of claim 9, wherein the bushing provides a range of motion of the substantially planar surface of at least five degrees (5°) in at least two directions.

16. The electronic apparatus of claim 9, wherein the floating connector further includes:

a retention structure arranged to retain the bushing within the housing.

17. The electronic apparatus of claim 9, wherein the electronic circuitry is arranged to function as a small cell networking device.

18. The electronic apparatus of claim 9, wherein the electronic circuitry includes edge processing capabilities.

* * * * *